US010614444B2

(12) United States Patent
Beck et al.

(10) Patent No.: US 10,614,444 B2
(45) Date of Patent: Apr. 7, 2020

(54) SYSTEMS AND METHODS FOR TEMPORARILY ACTIVATING A PAYMENT ACCOUNT FOR FRAUD PREVENTION

(71) Applicant: Capital One Services, LLC, McLean, VA (US)

(72) Inventors: Daniel Beck, Vienna, VA (US); Samantha Schneider, Atlanta, GA (US); Jessica Bowman, McLean, VA (US); Colleen Kerr, Washington, DC (US); Riken Shah, Ashburn, VA (US); Min Jung Kim, Fairfax, VA (US); Zeel Jha, Ashburn, VA (US); John Schmidt, Falls Church, VA (US); Krystle Voss, Alexandria, VA (US); Joshua Wilbur, Potomac, MD (US); Abhinav Agrawal, Washington, DC (US); Jeffrey Samitt, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/870,834

(22) Filed: Jan. 12, 2018

(65) Prior Publication Data
US 2018/0158044 A1 Jun. 7, 2018

Related U.S. Application Data

(63) Continuation of application No. 15/842,853, filed on Dec. 14, 2017, which is a continuation-in-part of
(Continued)

(51) Int. Cl.
*G06Q 40/00* (2012.01)
*G06Q 20/32* (2012.01)
(Continued)

(52) U.S. Cl.
CPC ......... *G06Q 20/3224* (2013.01); *G06Q 20/12* (2013.01); *G06Q 20/20* (2013.01);
(Continued)

(58) Field of Classification Search
CPC .................... G06Q 20/00; G06Q 20/3224
(Continued)

(56) References Cited

U.S. PATENT DOCUMENTS

| 2004/0148259 A1* | 7/2004 | Reiners ................. G06Q 20/02 705/42 |
| 2013/0046692 A1* | 2/2013 | Grigg ................... G06Q 40/00 705/44 |

(Continued)

*Primary Examiner* — Chia-Yi Liu
(74) *Attorney, Agent, or Firm* — Finnegan, Henderson, Farabow, Garrett & Dunner, LLP

(57) ABSTRACT

A system for temporarily enabling an otherwise disabled payment account for use in a transaction is configured to provide, based on a determination to disable a user's payment account, instructions to a user device of the user for displaying an application interface enabling the user to request to temporarily register the payment account for use in a transaction. The system is configured to receive a request, from the user device, to temporarily register the user's payment account to enable use of the payment account in a transaction, wherein the payment account is otherwise disabled based on a determination of fraud or possible fraud on the payment account, associate with the payment account, a transaction rule responsive to the request, the transaction rule defining a window of time in which a received transaction authorization request may be authorized for the payment account, and determine whether to approve the received transaction authorization request according to the temporary transaction rule, the determination being based on whether the transaction authorization request is received during the window of time. The system is also configured to transmit an authorization response to
(Continued)

the transaction authorization request based on the determination.

16 Claims, 13 Drawing Sheets

Related U.S. Application Data application No. 15/816,009, filed on Nov. 17, 2017, which is a continuation of application No. 15/141,293, filed on Apr. 28, 2016.

(60) Provisional application No. 62/154,334, filed on Apr. 29, 2015.

(51) Int. Cl.
*G06Q 20/34* (2012.01)
*G06Q 20/40* (2012.01)
*G06Q 20/20* (2012.01)
*G07F 7/08* (2006.01)
*G06Q 20/12* (2012.01)

(52) U.S. Cl.
CPC .......... *G06Q 20/34* (2013.01); *G06Q 20/405* (2013.01); *G06Q 20/4016* (2013.01); *G07F 7/0833* (2013.01)

(58) Field of Classification Search
USPC ..................................................... 705/35–45
See application file for complete search history.

(56) References Cited

U.S. PATENT DOCUMENTS

2014/0236261 A1* 8/2014 Ternes ............... A61N 1/37264
607/59
2016/0098702 A1* 4/2016 Marshall ................ G06Q 20/20
705/44

* cited by examiner

SYSTEMS AND METHODS FOR TEMPORARILY ACTIVATING A PAYMENT ACCOUNT FOR FRAUD PREVENTION

PRIORITY CLAIM

This application is a continuation of U.S. patent application Ser. No. 15/842,853, filed Dec. 14, 2017, which is a continuation-in-part of U.S. patent application Ser. No. 15/816,009, filed on Nov. 17, 2017, which is a continuation of U.S. patent application Ser. No. 15/141,293, filed on Apr. 28, 2016, which claims priority under 35 U.S.C. § 119 to U.S. Provisional Application No. 62/154,334, filed on Apr. 29, 2015, titled "Systems and Methods for Enabling Location-Based Payment for Fraud Prevention." The contents of the above-referenced applications are expressly incorporated herein by reference in their entireties.

TECHNICAL FIELD

The disclosed embodiments generally relate to systems and methods for implementing location-based authorization rules for fraud prevention.

BACKGROUND

In current payment systems, once a customer's payment account (e.g., a credit or debit card) and/or payment method associated with the account becomes associated with fraudulent behavior, the payment account and/or payment method generally are deactivated immediately to prevent further fraudulent use of the account. Specifically, financial account providers typically deactivate the account and/or the payment method immediately, and arrange for a new account and/or payment method to be set up and provided to the customer. For example, once a credit card number or account is associated with fraudulent behavior, the credit card and account number will no longer be usable by the customer, even when the customer remains in physical possession of the credit card itself. In some situations, it may take several days and up to more than one week for the customer to receive a replacement card and account number. During this time, a customer may be significantly inconvenienced by the inability to use the account for entering into a transaction.

Thus, there is a need for systems and methods capable of enabling legitimate continued use of a compromised payment account and/or payment method to conduct transactions while reducing the potential of fraudulent use.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides systems and methods for enabling continued use, on a restricted basis, of a payment method or account for which a financial service provider has identified fraudulent activity or has otherwise declared unusable. Continued use of the payment method or account may be limited by a location-based and/or time-based transaction rule. A user in possession of a payment card (or other payment method) may continue to use the payment method upon an additional verification that a transaction has been initiated at the verified location of the user. The user may verify his location using a geolocation device provided as part of a mobile device, for example, or based on a location-aware payment method. The user may actively request, using an app on the mobile device, for example, that the payment method and/or account be "activated" for use in an upcoming transaction. A financial service provider or other payment processing entity may then "activate" the payment method or account for a limited window of time, within which a transaction using the payment method may be authorized upon verification of the user's location. Additional aspects of the disclosed embodiments are set forth below in this disclosure.

The disclosed embodiments include a system for temporarily enabling an otherwise disabled payment account for use in a transaction. The system includes one or more memory devices storing instructions, and one or more processors configured to execute the instructions to provide, responsive to a determination to disable a user's payment account, instructions to a mobile device of the user enabling the user, via the mobile device, to request to temporarily register the payment account for use in a transaction. The one or more processors are also configured to receive a request, from the mobile device, to temporarily register the user's payment account for use in a transaction, and associate a temporary transaction rule with the payment account based on the request, wherein the payment account is otherwise disabled. The one or more processors are also configured to execute the instructions to receive transaction information associated with a transaction authorization request for the payment account, the transaction information including information enabling identification of a location of a transaction, to identify location information associated with the mobile device of the user, to determine, based on a comparison of the identified location information associated with the mobile device and the location of the transaction, whether to approve the transaction authorization request according to the temporary transaction rule, and to transmit an authorization response to the transaction authorization request based on the determination.

The disclosed embodiments include a computer-implemented method for temporarily enabling an otherwise disabled payment account for use in a transaction. The method includes receiving, by one or more processors, a request from a mobile device of a user to temporarily register the user's payment account for use in a transaction, wherein the payment account is otherwise disabled, and associating a temporary transaction rule with the payment account. The method also includes receiving transaction information associated with a transaction authorization request for the payment account, determining a location of origin of a transaction based on the transaction information, receiving location information of the mobile device of the user associated with the payment account, and determining whether to approve the transaction authorization request based in part on the temporary transaction rule, the location of origin of the transaction, and the received location information of the mobile device. The method further includes transmitting an authorization response to the transaction authorization request based on the determination.

The disclosed embodiments include a system for temporarily enabling an otherwise disabled payment account for use in a transaction. The system includes one or more memory devices storing instructions, and one or more processors configured to execute the instructions to provide, based on a determination to disable a user's payment account, instructions to a user device of the user for displaying an application interface enabling the user to request to temporarily register the payment account for use in a transaction. The one or more processors also are configured to receive a request, from the user device, to temporarily register the user's payment account to enable use of the payment account in a transaction, wherein the payment account is otherwise disabled based on a determination of fraud or possible fraud on the payment account. Moreover, the one or more processors are further configured to associate with the payment account, a transaction rule responsive to the request, the transaction rule defining a window of time in which a received transaction authorization request may be authorized for the payment account. The one or more processors are even further configured to determine whether to approve the received transaction authorization request according to the temporary transaction rule, the determination being based on whether the transaction authorization request is received during the window of time. In addition, the one or more processors are configured to transmit an authorization response to the transaction authorization request based on the determination.

In addition, the disclosed embodiments include a computer-implemented method for temporarily enabling an otherwise disabled payment account for use in a transaction. The method includes providing, based on a determination to disable a user's payment account, instructions to a user device of the user for displaying an application interface enabling the user to request to temporarily register the payment account for use in a transaction. The method also includes receiving a request, from the user device, to temporarily register the user's payment account to enable use of the payment account in a transaction, wherein the payment account is otherwise disabled based on a determination of fraud or possible fraud on the payment account. The method includes associating with the payment account, a transaction rule responsive to the request, the transaction rule defining a window of time in which a received transaction authorization request may be authorized for the payment account. The method further includes determining whether to approve the received transaction authorization request according to the temporary transaction rule, the determination being based on whether the transaction authorization request is received during the window of time. Even further, the method includes transmitting an authorization response to the transaction authorization request based on the determination.

In accordance with additional embodiments of the present disclosure, a computer-readable medium is disclosed that stores instructions that, when executed by a processor(s), cause the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
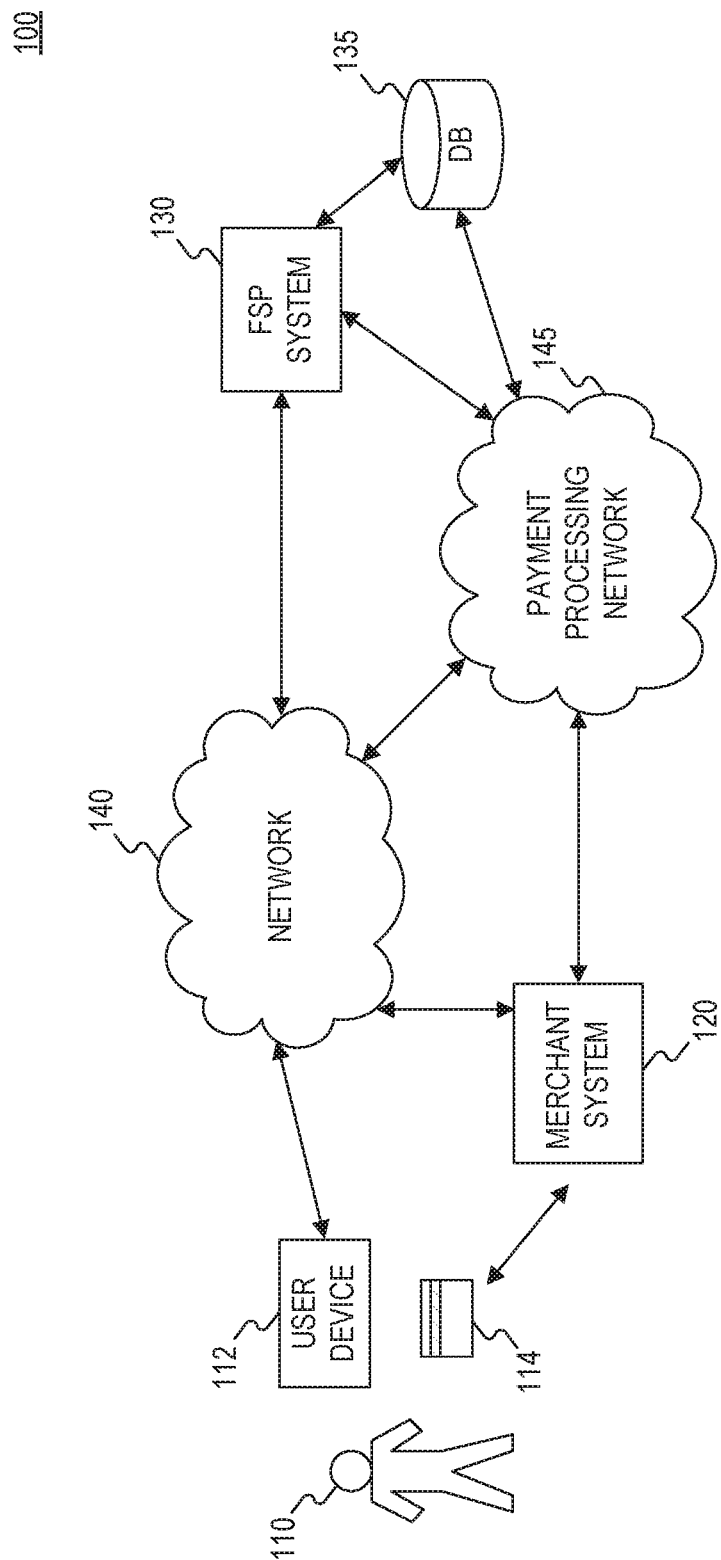
FIG. 1 is a block diagram of an exemplary system, consistent with the disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes an advantageous, rule-based transaction authorization system and method for enabling continued, temporary, and/or restricted use of a payment method and/or account for a transaction in which a payment method or account may have been otherwise declared unusable. In some embodiments, a location-based rule may be associated with the payment method to enable continued use of the payment method upon satisfying a location condition as part of an authorization decision. Additionally or alternatively, a time-based rule may be associated with the payment method, enabling continued use of the payment method upon satisfying a timing condition. According to some embodiments, the location-based rule may be established and verified based on a user's current location determined using a location-aware device, such as a smartphone, for example, or a payment card including a location sensing device.

A common trigger for preventing use of a payment method or an account includes the detection of fraudulent (or potentially fraudulent) behavior using the payment method or account. For many financial service providers, an account and/or payment method may be declared inactive upon detection of fraudulent behavior, thus preventing the use of the account or payment method for entering a transaction. In many cases, a customer or owner of the account may maintain physical possession of the payment method (e.g., a payment card, credit card, debit card, etc.). Thus, the customer would otherwise be able to enter into a transaction using the payment method but for the financial service provider declaring the account unusable. The disclosed embodiments enable customers, such as those in possession of the payment method, to continue use of the payment method for a transaction upon satisfying additional rules for the transaction.

In some embodiments, once a payment method or account has been disabled or declared unusable, a customer may actively request that the payment method be activated for use in a transaction. The request may be made using a mobile device or other device, and in some embodiments may be authenticated. The request may include an indication of the current location of the user. Upon receiving the request, a financial service provider or other associated payment processor may associate a rule with the payment method and/or account based on the current location of the user. The rule may be associated with the account for a predefined period of time sufficient to enable a customer to enter into a transaction. The customer may then enter into a transaction using the payment method previously declared unusable. In some embodiments, the payment method and/or account may return to its previous restricted state regardless of whether time remains within the predefined period of time indicated in the rule that became associated with the payment method and/or account based on the request.

During a pre-authorization process for a transaction initiated with the payment method, a financial service provider or associated payment processor may determine whether to authorize the transaction based on location information received from a merchant and the user's current location. Upon determining a match in the location information within a predetermined threshold (e.g., distance between the location indicated by the merchant and the user's current location), the financial service provider or payment processor may authorize the transaction. Following authorization, the payment method may once again return to its prior restricted state, For example, in some embodiments, a customer may be able to continue use of a payment method or account that has otherwise been declared unusable, based on passive sensing of the user's location. A user operating a location-aware mobile device, such as a smartphone with GPS capability, may enable a financial service provider to sense the user's location. The financial service provider may then update an account record to include the user's last known "current" location. The user may then continue normal use of the payment method for initiating a transaction. During a pre-authorization process for an initiated transaction, location information associated with a merchant may be compared with the then "current" location of the user to verify that the transaction has been initiated from the same location as the user.

Thus, the disclosed systems and methods overcome problems known to traditional systems in the transaction technology fields. For example, in many situations, users that remain in possession of a payment card or other payment method may be significantly inconvenienced by the inability to continue use of the payment method once a financial service provider has decided to "deactivate" the payment method or otherwise declare the payment method unusable. Some users may not possess another payment card, and in an emergency situation may be unable to initiate a necessary transaction. Despite a history of, or potential for, fraudulent activity using a payment method, the disclosed systems and methods enable continued, restricted, and/or limited use of the payment method based on additional authentication measures. The additional authentication measures include "current" location information that is dynamic and not easily spoofed or otherwise capable of re-creation by a fraudster. Additionally, in some embodiments, a payment method may be "activated" for a particular transaction or set of transactions for a limited duration of time in which a user may initiate a transaction using the payment method. It is unlikely that a fraudster may coincidentally also attempt to use the payment account for a transaction during the limited window of time, much less according to the conditions (e.g., location restrictions) set in other additional authentication methods.

The following disclosure provides exemplary systems and methods for enabling continued, temporary, and/or restricted use of a payment method that may otherwise have been declared unusable, thus realizing the above advantages and benefits over conventional systems.

FIG. 1 shows a diagram of an exemplary system 100 configured to enable continued use of a payment method otherwise declared unusable, consistent with disclosed embodiments.

As shown in FIG. 1, system 100 may include a user device 112 and a payment card 114 associated with a user 110. System 100 may also include a merchant system 120 with which user 110 may enter into a transaction using payment card 114 or user device 112. Merchant system 120 may communicate with a financial service provider (FSP) system 130 via payment processing network 145 to authorize the transaction. System 100 may also include a database 135 accessible to FSP system 130 and/or payment processing network 145 to authorize or otherwise process the transaction, among other things. System 100 may also include network 140 to facilitate communication among the components of system 100 and, in some embodiments, to enable user device 112 to conduct an e-commerce transaction with merchant system 120. Network 140 may also facilitate a user device 112 to communicate with FSP system 130 to request and register one or more transaction rules to be associated with a user's 110 account with the financial service provider, consistent with the disclosed embodiments.

The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

System 100 may include one or more user devices 112 associated with one or more users 110. A user 110 may operate a user device 112, which may be a desktop computer, laptop, tablet, smartphone, multifunctional watch, pair of multifunctional glasses, tracking device, or any suitable device with computing capability. User device 112 may have a financial application installed thereon, which may enable user device 112 to communicate with FSP system 130 via network 140 and perform aspects of the disclosed methods. For example, user device 112 may connect to FSP system 130 and/or merchant system 120 through use of browser software. User device 112 may allow a user to access information stored in FSP system 130, such as, for example, financial information related to recent purchase transactions, financial statements, account information, rewards program information and the like. User device 112 may also be configured to enter a purchase or payment transaction as a mobile payment device. An exemplary computer system consistent with user device 112 is discussed in additional detail with respect to FIG. 2.

User 110 may operate user device 112 to perform one or more operations for managing a customer or client account associated with FSP system 130, such as entering a payment transaction. In some aspects, user 110 may be a customer or client of a financial service provider associated with FSP system 130. For instance, a financial service provider may maintain a financial service account (e.g., credit card account, checking account, etc.) that the user 110 may use in a transaction, such as, for example, a purchase of goods and/or services online or at brick and mortar locations associated with a merchant relating to merchant system 120. Consistent with disclosed embodiments, user 110 may operate user device 112 to initiate a purchase transaction with a merchant or merchant system 120. Payment transactions initiated with user device 112 may include an e-commerce transaction or a mobile payment transaction. A purchase transaction may also be initiated with a merchant or merchant system 120 using any known method, such as presentation of a payment card 114 (e.g., a bank card or credit card), or the presentation of bank card or credit card information. Further, user 110 may operate user device 112 to view a financial service account or financial statement provided by a financial service provider or FSP system 130 and perform certain requests to enable continued use of a payment method that may otherwise have been disabled or declared unusable.

Payment card 114 may include a physical card or other payment device, typically issued by a financial service provider and associated with a customer or client account. Payment card 114 may also be configured as a dangle, a fob, an e-wallet or any electronic device enabling user 110 to enter into a transaction. In some embodiments, payment card 114 may be presented at a merchant or merchant system 120 to initiate a transaction. In the disclosed embodiments, payment card 114 and/or user device 112 may correspond to a payment method when used to enter into a transaction.

In accordance with the disclosed embodiments, user device 112 and/or payment card 114 may include one or more components for determining and/or transmitting information used to determine a current location of user device 112 or payment card 114. In some embodiments, user device 112 may include a GPS module or may implement other geolocation systems (such as those based on cellular triangulation, short-range or near-field wireless communications, etc.) for determining a current location. For example, user device 112 may include one or more ranging systems based on a close range or near field wireless signal, such as BLUETOOTH LE™ beacons or other wireless technology for sensing a location. Payment card 114 may also be configured to be similarly location-aware via a GPS module or other location sensing device. Payment card 114 and user device 112 may include both passive and/or active location sensing devices. Thus, in some embodiments, user device 112 and payment card 114 may be configured to actively transmit location information, or transmit location information upon "activation" by a location detection or sensing device.

User device 112 and payment card 114 may be configured to determine and transmit location information, or they may be configured to transmit information from which their location may be determined. For example, in some embodiments, a user's location may be determined based on connectivity to a Wi-Fi access point with a known location. In the disclosed embodiments, other aspects of system 100 may be configured to detect a user 110's current location. In some embodiments, location information may be transmitted to FSP system 130 via network 140, for example. In other embodiments, location information may be transmitted to FSP system 130 via payment processing network 145, for example, as part of a transaction. In some embodiments, transmission of location information may be enabled via one or more devices provided as part of merchant system 120. For example, merchant system 120 may include one or more devices for sensing the presence or location of user device 112 and/or payment card 114. In some embodiments, the sensed location information may be transmitted to FSP system 130 or other payment processing system of payment processing network 145 as part of a transaction authorization request.

In accordance with disclosed embodiments, FSP system 130 may be a system associated with a financial service provider (not shown), such as a bank, a credit card company, a lender, brokerage firm, or any other type of financial service entity that generates, provides, manages, and maintains financial service accounts for one or more users 110. FSP system 130 may include one or more computing systems that are configured to execute software instructions stored on one or more memory devices to perform one or more operations consistent with the disclosed embodiments. For example, FSP system 130 may include one or more memory device(s) storing data and software instructions and one or more processor(s) configured to use the data and execute the software instructions to perform server-based functions and operations known to those skilled in the art. FSP system 130 may include one or more computing components specifically programmed and combined or arranged to perform the disclosed methods.

In certain embodiments, FSP system 130 may be configured as a particular apparatus, system, and the like, based on the storage, execution, and/or implementation of the software instructions that perform one or more operations consistent with the disclosed embodiments. FSP system 130 may be standalone, or it may be part of a subsystem, which may be part of a larger system. For example, FSP system 130 may represent distributed servers that are remotely located and communicate over a public network (e.g., network 140) or a dedicated network, such as a LAN, for a financial service provider. An exemplary computing system consistent with FSP system 130 is discussed in additional detail with respect to FIG. 2, below.

FSP system 130 may include or may access one or more storage devices configured to store data and/or software instructions used by one or more processors of FSP system 130 to perform operations consistent with the disclosed embodiments. For example, FSP system 130 may include memory configured to store one or more software programs that perform several functions when executed by a processor, including functions specific to the disclosed methods. The disclosed embodiments are not limited to separate programs or computers configured to perform dedicated tasks. For example, FSP system 130 may include memory that stores a single program or multiple programs. Additionally, FSP system 130 may execute one or more programs located remotely from FSP system 130. For example, FSP system 130 may access one or more remote programs stored in memory included with a remote component (such as database 135) that, when executed, perform operations consistent with the disclosed embodiments.

In certain aspects, FSP system 130 and/or database 135 may include server software that generates, maintains, and provides services associated with processing financial transactions. In some embodiments, FSP system 130 may connect with separate server(s) or other computing devices associated with database 135 that generate, maintain, and provide services associated with financial data for a financial service provider associated with FSP system 130. For example, database 135 may include a number of storage and processing components and associated software for storing account information of customers or clients of a financial service provider for use in authorizing and processing a transaction. Database 135 may be associated with FSP system 130 and made accessible to payment processing network 145 for performing various transaction authorization and processing functionality. In some embodiments, database 135 may be provided as part of payment processing network 145.

System 100 may also include one or more merchant systems 120. Merchant system 120 may be a computing system that is associated with a merchant or other business entity that provides goods and/or services, such as a restaurant, retailer, grocery store, service provider (e.g., utilities, etc.), or any other type of entity that may engage in any financial transaction (e.g., charity, tax collector, etc.) or other commercial transaction with a consumer, including health care providers, education providers, etc. While system 100 is shown with one merchant system 120 for ease of discussion, the disclosed embodiments may also be implemented in a system 100 including two or more merchant systems 120 associated with any number of underlying entities (commercial or otherwise). Further, merchant system 120 is not limited to conducting business in any particular industry or field.

Merchant system 120 may be associated with a merchant brick and mortar location(s) that a user 110 may physically visit and purchase goods and services. Such physical locations may include computing devices that perform financial service transactions with consumers (e.g., Point of Sale (POS) terminal(s), kiosks, etc.). Merchant system 120 may also include one or more location sensing devices configured to sense the presence or location of a user based on signals received from user device 112 or payment card 114. Merchant system 120 may also include back and/or front-end computing components that store data and execute software instructions to perform operations consistent with the disclosed embodiments, such as computers that are operated by employees of the merchant (e.g., back office systems, etc.). Merchant system 120 may also be associated with a merchant that provides goods and/or services via known online or e-commerce types of solutions. For example, such a merchant may sell goods or otherwise accept payment via a website using known online or e-commerce solutions to market, sell, and process online transactions conducted via network 140, for example.

In one embodiment, merchant system 120 may include one or more servers or other type of computer devices. The merchant system server(s) may be one or more computing devices configured to execute software instructions stored in memory to perform one or more processes consistent with the disclosed embodiments. For example, merchant system 120 may include one or more memory device(s) storing data and software instructions, and one or more processor(s) configured to use the data and execute the software instructions to perform server-based functions and operations known to those skilled in the art.

Merchant system 120 may further include server(s) that are configured to execute stored software instructions to perform operations associated with a merchant, including one or more processes associated with pre-authorization and processing of purchase transactions, generating transaction data (e.g., merchant name and location identifiers), and generating product data (e.g., SKU data) relating to purchase transactions, etc. Merchant system 120 may include one or more servers that may include a general purpose computer, a mainframe computer, or any combination of these components. In certain embodiments, merchant system 120 (or a system including merchant system 120) may be configured as a particular apparatus, system, and the like based on the storage, execution, and/or implementation of the software instructions that perform one or more operations consistent with the disclosed embodiments. A merchant server may be standalone, or it may be part of a subsystem, which may be part of a larger system. For example, a merchant server may represent distributed servers that are remotely located and communicate over a public network (e.g., network 140) or a dedicated network, such as a LAN. An exemplary computing system consistent with merchant system 120 is discussed in additional detail with respect to FIG. 2.

In certain aspects, merchant system 120 may include one or more web servers that execute software that generates, maintains, and provides a web site(s) for a respective merchant that is accessible over network 140. In other aspects, a merchant system 120 may connect separately to web server(s) or similar computing devices that generate, maintain, and provide a web site(s) for a merchant.

In certain embodiments, a merchant may operate computing components associated with merchant system 120 to perform one or more processes consistent with the disclosed embodiments. For example, merchant system 120 may be configured to execute software instructions to provide transaction data and/or product data and other data relating to purchase transactions to FSP system 130 over network 140 or payment processing network 145. Additionally, merchant system 120 may be configured to execute software instructions to perform pre-authorization and other transaction processing operations regarding a transaction entered into using a financial service account associated with FSP system 130. These processes may be performed using payment processing network 145 that may be in communication with FSP system 130 and database 135.

Payment processing network 145 may include any number of computing components, systems, and subsystems in communication with merchant system 120, FSP system 130, and database 135 for processing a payment transaction. For conciseness, payment processing network 145 may include any configuration or combination of known payment processing networks and systems implemented for authorizing, clearing and settling a transaction. Payment processing network 145 may generally include the underlying systems for receiving a transaction authorization request from a merchant system 120, performing verification and fraud analysis on the payment method, communicating with a FSP system 130 associated with the payment method, providing an authorization decision to merchant system 120, clearing an authorized transaction, and settling the transaction through the payment of funds or otherwise. In some embodiments, payment processing network 145 may include a number of systems not shown, such as a financial service provider system associated with merchant system 120, a third party payment processor system, a card network and processing system (e.g., such as Visa, MasterCard, etc.) and any other systems related to processing payment transactions. In some embodiments, aspects of payment processing network 145 may include aspects of network 140 for the communication of various transaction data or other communications between various systems of payment processing network 145.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of system 100. Network 140 may also include a public switched telephone network ("PSTN") and/or a wireless cellular network. Network 140 may be a secured network or unsecured network. In some embodiments, one or more components of system 100 may communicate directly through a dedicated communication link(s), such as links between FSP system 130 and merchant system 120.

Other components known to one of ordinary skill in the art may be included in system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including close range communication protocols, such as those employed under the name BLUETOOTH™ or BLUETOOTH LE™, and Wi-Fi, or any known near field communications (NFC) techniques, or other suitable communication methods that provide a medium for transmitting data between separate devices. In some embodiments, user device 112 and/or payment card 114 may communicate with one or more merchant systems 120 using direct communication technologies to transmit location information or other information used to determine the location of user device 112 and/or payment card 114.

Figure 2:
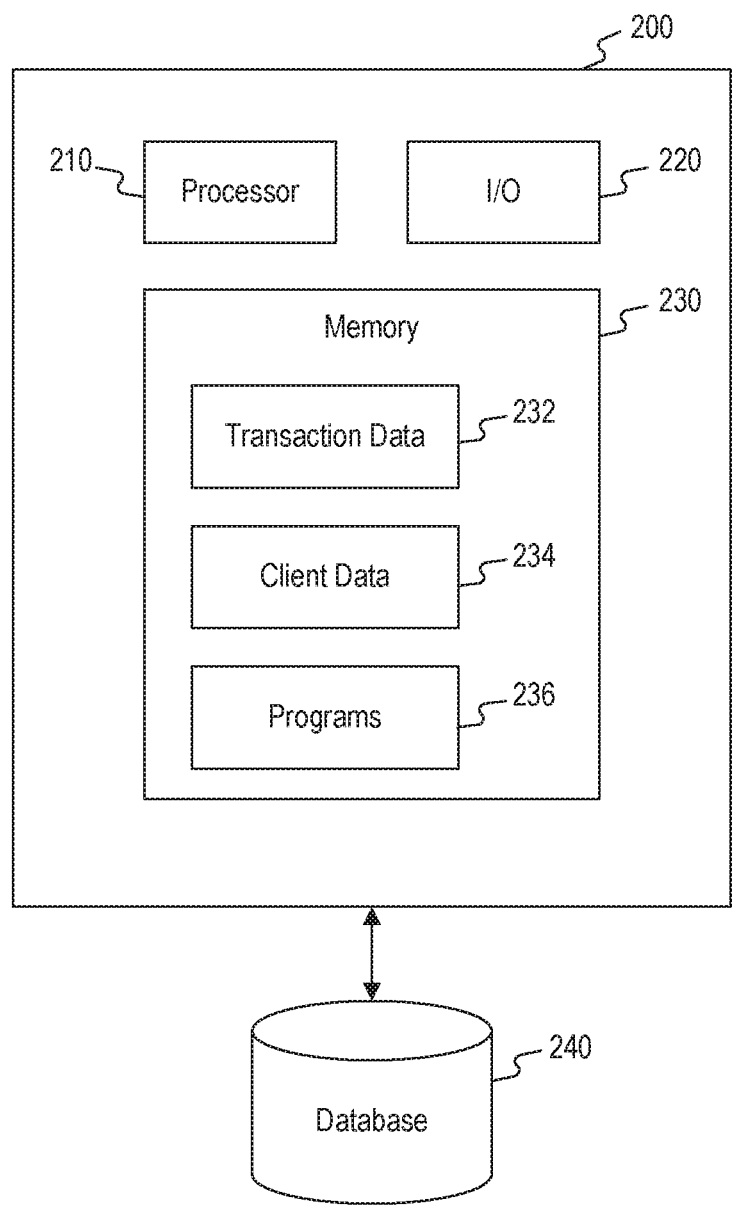
FIG. 2 is a block diagram of an exemplary computing system, consistent with the disclosed embodiments.

System 100 includes a number of components generally described as computing devices. Each of the computing devices may include any number of computing components particularly configured as a special purpose computing device to perform the functionality disclosed herein. FIG. 2 shows a diagram of an exemplary computing system 200 illustrating a computing system configuration that may be associated with FSP system 130, merchant system 120, one or more payment processing systems provided as part of payment processing network 145, and/or user device 112, consistent with the disclosed embodiments.

FIG. 2 is a block diagram of an exemplary computing system 200, consistent with the disclosed embodiments. In one embodiment, computing system 200 may include one or more processors 210, one or more memories 230, and one or more input/output (I/O) devices 220. In some embodiments, computing system 200 may take the form of a server, specially-programmed computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform functions associated with the disclosed embodiments. For example, memory 230 may be configured with one or more software instructions, such as one or more program(s) 236 that perform particular functions when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP system 130, merchant system 120, or user device 112, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, and generating and associating transaction rules to one or more accounts based on a location according to the disclosed embodiments.

Memory 230 may also store data that may reflect any type of information in any format that the system may use to perform operations consistent with the disclosed embodiments. Memory 230 may store instructions to enable processor 210 to execute one or more applications, such as server applications, network communication processes, and any other type of application or software, including software directed to enabling a customer to complete a transaction using a payment method or account previously declared unusable according to the disclosed embodiments. Alternatively, the instructions, application programs, etc., may be stored in an external storage (such as database 240) in communication with computing system 200 via network 140 or any other suitable network. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Memory 230 may include transaction data 232. Transaction data 232 may include information related to purchase or payment transactions initiated by user 110. For example, transaction data may include a user identifier and a purchase price or payment amount and any other relevant transaction or merchant specific information including a location of the merchant and/or the location of the transaction. The user identifier may be a credit or debit card number, an account number, or another means for identifying the user initiating the purchase transaction. The purchase price may include a number representing the total sale price of the purchase transaction and/or may include a list of the various items purchased from the merchant or a category of items purchased. In other embodiments, a payment amount may include a sum of the transaction amount and other general information related to the payment including the name of the recipient, time and date of payment, and reason for payment etc.

In some embodiments, merchant system 120 may collect, generate, and provide transaction data relating to purchase transactions involving a user to FSP system 130 and/or other systems provided as part of payment processing network 145. In some embodiments, merchant system 120 may further provide additional information to FSP system 130 including product or service data (e.g., SKU data) and other data such as a geographical location of a merchant and/or the geographical location of the transaction and any other data relating to purchase transactions involving a user. Merchant system 120 may provide this information to FSP system 130 via payment processing network 145 or network 140. Alternatively, transaction data 232 may be stored in database 240, which may be an external storage device in communication with computing system 200 via network 140 or any other suitable network including payment processing network 145.

Memory 230 may further include client data 234, which may include information about particular clients of the financial service provider. For example, client data 234 may include client account information, debit or credit card information, history of purchase or payment transactions, financial statements, and one or more transaction rules and location information according to the disclosed embodiments. Client data 234 may include a data record associating a client account with one or more other accounts according to the one or more transaction rules. Client data 234 may further contain one or more user profiles corresponding to individual client accounts. In some embodiments, client data 234 may be stored in database 240, which may be an external storage device in communication with computing system 200 via network 140 or any other suitable network including payment processing network 145.

Processor 210, upon execution of one or more programs 236, may perform the functionality of the disclosed embodiments for enabling a user to continue temporary or restricted use of a payment method or account that has otherwise been declared unusable. In the disclosed embodiments, processor 210 may analyze received transaction data 232 in reference to one or more transaction rules and location information associated with client data 234 to perform the disclosed functionality.

For example, processor 210 may analyze transaction data to determine which client with information stored in client information 234 is initiating the purchase transaction. Additionally, processor 210 may analyze the transaction data 232 with respect to location information and one or more transaction rules stored in association with client data 234 to determine whether the transaction may be authorized. In some embodiments, processor 210 may analyze a client request to enable use of a payment method for a future transaction, and associate a transaction rule with the client account stored in client data 234 to update the client account information accordingly. Processor 210 may also receive and/or determine location information corresponding to a location of user 110, and associate such information with the client account in client data 234. Processor 210 may also access data records stored as client data 234 to determine client account information, debit or credit card information, history of purchase transactions, financial statements and/or one or more transaction rules associated with an account. Other programmable functions of processor 210 are described in greater detail below.

I/O devices 220 may be one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as one or more keyboards, mouse devices, and the like, which may enable computing system 200 to receive input from an operator of FSP system 130 (not shown).

Computing system 200 may also contain one or more database(s) 240. Alternatively, computing system 200 may be communicatively connected to one or more database(s) 240. Computing system 200 may be communicatively connected to database(s) 240 through a direct connection and/or a network (e.g., network 140, payment processing network 145, etc.). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

As discussed above, FSP system 130 may include at least one computing system 200. Further, although sometimes discussed here in relation to FSP system 130, it should be understood that variations of computing system 200 may be implemented in other components of system 100, including merchant system 120, aspects of payment processing network 145, and user device 112. Computing system 200 may be a single server or may be configured as a distributed computer system including multiple servers or computers that interoperate to perform one or more of the processes and functionalities associated with the disclosed embodiments.

In some aspects, merchant system 120 may include the same or similar configuration and/or components of computing system 200. Computing system 200 when implemented in merchant system 120 may include any hardware and/or software installed therein necessary for performing methods and processes of the disclosed embodiments, such as for example, the processing of a payment transaction and receipt of location information.

Merchant system 120, implementing a computing system 200, may sell or otherwise accept payment for products and/or services via network 140. For example, user 110 may use a user device 112 to browse a webpage hosted or otherwise associated with merchant system 120 that runs on computing system 200, and may make a purchase of products or services offered by merchant 120 via the webpage. In other embodiments, user 110 may initiate a purchase using payment card 114 (or user device 112) at a brick and mortar establishment associated with a merchant, and merchant system 120 (via, e.g., computing system 200, which may be a point of sale terminal in some embodiments) may communicate with FSP system 130 over network 140, or payment processing network 145 to authorize the purchase. A computing system 200 implemented as part of merchant system 120 may facilitate the transmission and receipt of transaction information and authorization to and from financial service provider system 130.

The following processes are directed to various embodiments for enabling a user 110 to continue use of a payment method on a temporary or restricted basis for a transaction when the payment method has been previously declared unusable. In particular, the processes of some embodiments implement a location-based restriction on the use of a payment method. In some embodiments, the current location of a user 110 may be determined and compared to a location of the transaction as part of a decision whether to authorize the transaction. The following processes may be performed by various aspects and components of system 100 and computing system 200 as is apparent from the disclosure.

Figure 3:
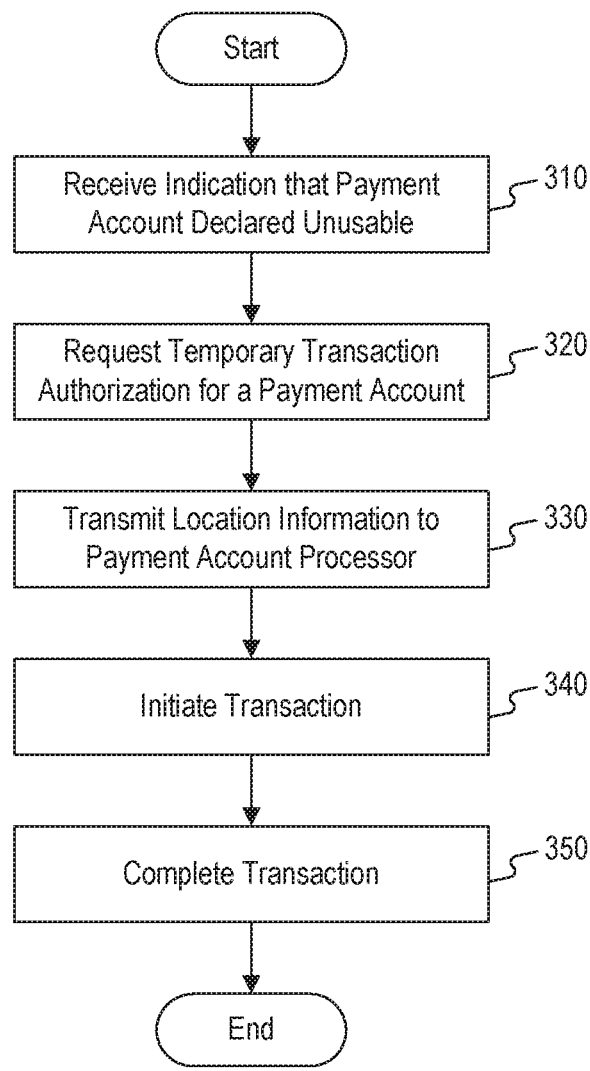
FIG. 3 is a flowchart of an exemplary process for requesting temporary transaction authorization, consistent with the disclosed embodiments.

FIG. 3 shows an exemplary process 300 for enabling a user 110 to request temporary transaction authorization for a payment method or payment account that has been declared otherwise unusable. In some embodiments, a payment method or account may be declared unusable based on a detection of actual or probable fraud, or as a preventive measure based on an increased risk of fraud, such as may result from a data breach, for example, or for any other reason in which it may be advantageous to restrict or prohibit use of a payment method or account. Fraudulent activity using a payment method or account may be determined by a FSP system 130, one or more systems of payment processing network 145, or by user 110. Fraudulent activity may be determined according to any known manner using a variety of techniques and analysis to detect or determine potential fraud. Upon a detection of actual or possible fraudulent activity using known systems and techniques or as a preventive measure etc., FSP 130 associated with the payment method or account may declare the payment method and account unusable. The payment method and account may remain unusable, for example, until a replacement payment method is issued and received.

In some embodiments, a user 110 may be notified that the user's account or payment method may be or has been declared unusable (step 310). As part of step 310, user 110 may receive indication via any known methods including via an e-mail, text message, phone call, or other indication received via user device 112. For example, indication may be received by an in-app message or indication provided by an application executed on user device 112 such as an app associated with a financial service provider with which the payment method or account is held. The app may be a proprietary app enabling user 110 to manage his account with the financial service provider, as well as to provide other functionality disclosed herein. Additionally, in some embodiments, user 110 may be notified that the user's account or payment method is unusable based on an attempted transaction that was not authorized. Any other manner or method of receiving indication that a payment method has been declared unusable is contemplated by the present disclosure.

In some embodiments, upon declaring a payment account as unusable, FSP system 130 may provide an app (or app update) providing functionality particular to the disclosed methods to user 110 for executing on user device 112. The app or app update may thus enable a user to continue use of the payment method or account according to the disclosed embodiments. Additionally, in some embodiments, certain functionality particular to the disclosed methods may be "unlocked" within an existing financial service provider app executed on user device 112. Other methods for enabling user device 112 to perform the disclosed methods are contemplated by the present disclosure.

In some embodiments, user 110 may request a temporary transaction authorization for a payment method or account that has been declared unusable (step 320). A user request may be transmitted to FSP system 130 using an app executed on user device 112. The app executed on user device 112 may include software and/or hardware instructions to generate an interface displayed on user device 112, similar to that described below in FIG. 6. An exemplary interface may be configured to enable user 110 to quickly request authorization for an anticipated transaction by pressing or selecting a button, for example, as described in further detail below. The exemplary interface may also enable user 110 to provide additional parameters related to the request.

In some embodiments, user 110 may be instructed to request the temporary transaction authorization within a predefined or configurable window of time associated with an anticipated transaction. For example, in some embodiments, a temporary transaction authorization may be valid only for a set window of time within which user 110 must initiate a transaction using the otherwise unusable payment method or account. As an example, a predefined window of time may be no more than a set number of minutes. In some embodiments, however, the window of time may be significantly larger or smaller depending on a number of other factors, such as a determination that fraudulent activity has actually occurred using the account, for example.

In some embodiments, user 110 may be instructed to input various information related to the requested transaction, such as a merchant identifier, anticipated transaction amount, etc. For an e-commerce type of transaction, user 110 may also be instructed to input additional information regarding the website or other identifier of the e-commerce merchant, in addition to a device identifier used to initiate the remote e-commerce transaction. Other information that may be useful for authenticating a transaction, such as an IP address of the device initiating a transaction, may also be requested. The additional information may be provided by user 110 using an input on user device 112, for example. In other embodiments, some of the information (such as a device identifier or IP address) may automatically be generated and transmitted by user device 112, as part of the request.

The disclosed embodiments enable a user 110 to continue use of a payment method or account that has been declared unusable by providing an additional layer of security or authorization on top of the measures implemented under standard use of the payment method or account. For example, in some embodiments, the request for temporary transaction authorization may provide only a limited window of time within which a payment method or account may be used for a transaction. Thus, even if the payment method or account has been compromised, it may be unlikely that a fraudulent transaction will coincidentally be initiated during the limited duration of time associated with the temporary transaction authorization request. To ensure a level of security, in some embodiments, the request for temporary transaction authorization may itself include one or more credentials for authenticating the user and the request. In some embodiments, a credential may include a fingerprint scan or password or other token captured and transmitted using an app executed on user device 112, for example. Other authentication measures or techniques may also be implemented.

In some embodiments, authentication of user device 112 or an app executed on user device 112 may also provide additional authentication for a user 110 presumed to be operating user device 112. Operation of user device 112 or an app executed by user device 112 may require initial authentication that may be sufficient to authenticate user 110. Thus, in some embodiments, certain requests or signals received from user device 112 may be used to authenticate a user 110 associated with the user device 112. For example, in some embodiments, a user's 110 location may be determined based on a location signal or information received from a user device 112 associated with the user 110. In some embodiments, the location information may be used to authenticate a transaction.

In some embodiments, in conjunction with step 320, or as a separate step (330, as shown), location information associated with user 110 may be transmitted to a payment account processor. In some embodiments, FSP system 130 may correspond to a payment account processor, whereas in other embodiments, a payment account processor may correspond to another entity provided as part of payment processing network 145. Location information may be transmitted to database 135, associated with either FSP system 130 or payment processing network 145. Location information may be transmitted via user device 112 or a payment card 114 configured to provide location information, and may be transmitted over network 140 and/or payment processing network 145.

In some embodiments, user device 112 may be configured to determine a current location of user 110 and transmit the current location to FSP system 130. In some embodiments, for example, location information may be transmitted from user device 112 upon selection by a user 110. Location information may be transmitted as part of an operation performed by a financial service provider app executed on user device 112, and in some embodiments may be provided as part of the request for a temporary transaction authorization (step 320) or when initiating a transaction (step 340). In some embodiments, location information may also be transmitted to one or more devices of merchant system 120 configured to sense or detect a location of a user device 112 or payment card 114. In these embodiments, location information associated with user 110 may be transmitted as part of a transaction authorization process.

In the disclosed embodiments, the transmitted location information may be used by the FSP system 130, or other system provided as part of payment processing network 145, to authorize a transaction using a payment method or account for which the temporary transaction authorization request was made in step 320. In some embodiments, the location information may be associated with the payment method or account and compared with other received transaction data to authorize a transaction. These operations are discussed in greater detail below with respect to FIG. 4.

As part of step 340, user 110 may then initiate a transaction using a payment method, such as that associated with a payment card 114 or other payment application provided as part of user device 112. The transaction may be initiated using a payment method or account that was previously declared unusable and for which a temporary transaction authorization was requested. The transaction may be initiated at a physical merchant location associated with merchant system 120, for example, or may be initiated remotely, such as for an e-commerce transaction. Upon initiating a transaction, a merchant system 120 may request authorization of the transaction using known payment authorization systems improved by the disclosed embodiments. Merchant system 120 may receive an authorization decision approving the transaction and then the transaction may be completed (step 350).

Figure 4:
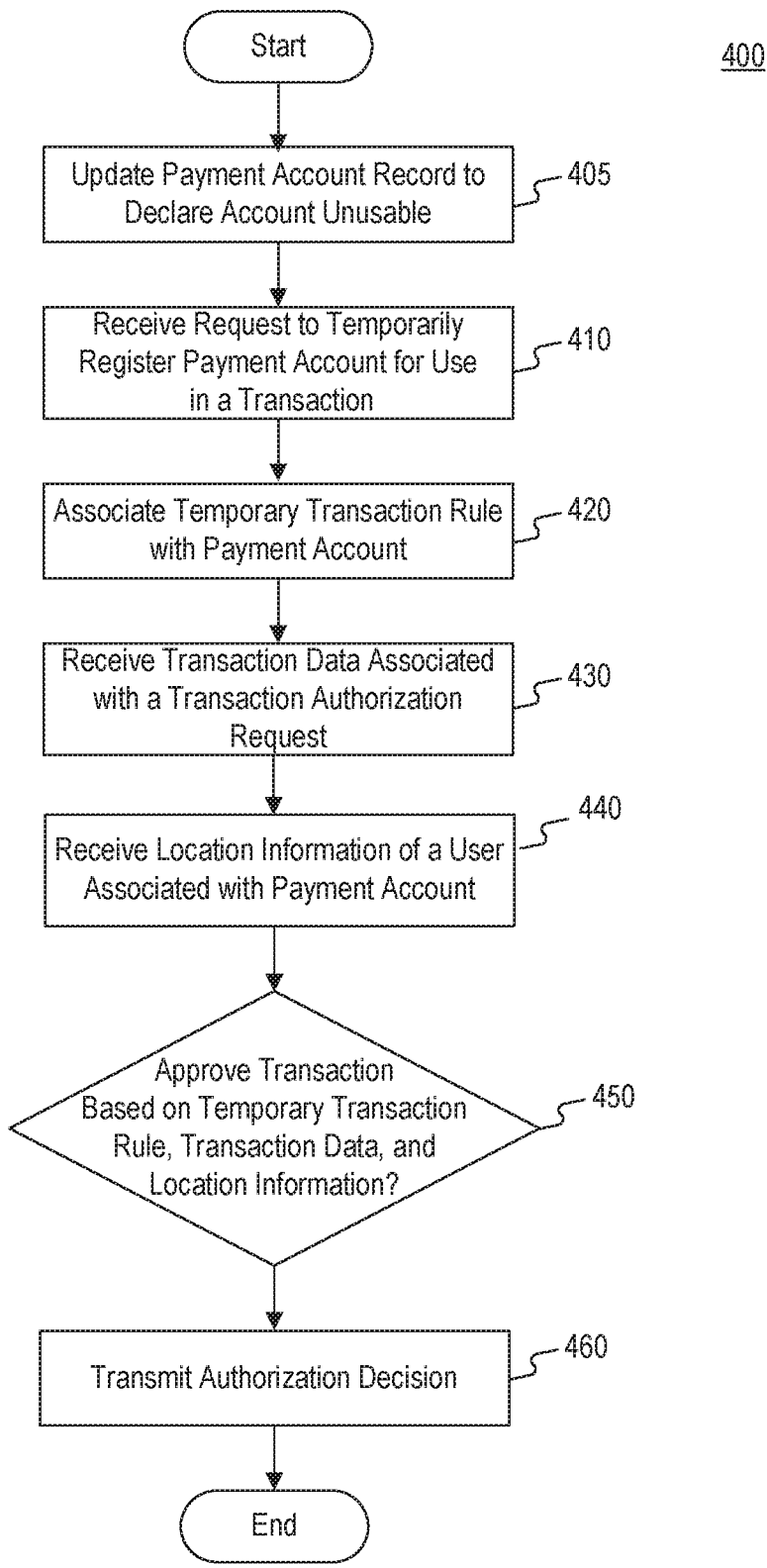
FIG. 4 is a flowchart of an exemplary authorization process for authorizing a transaction, consistent with the disclosed embodiments.

The improved authorization systems and methods discussed in detail with respect to FIG. 4, which shows an exemplary process 400 in which a user 110 actively requests a temporary transaction authorization, as described above with respect to step 320 in FIG. 3. Process 400 may be performed by FSP system 130, or other systems provided as part of payment processing network 145, or a combination of different aspects of the systems.

As shown in FIG. 4, once FSP system 130 detects fraudulent behavior associated with a payment account of a client, or otherwise determines to declare the payment account as unusable, a data record corresponding to the payment account may be updated to include a related status indication (step 405). In some embodiments, FSP system 130 may update one or more data records associated with the payment account, stored as client data 234, for example, to include a data item flag or some other status or indication that the account has been declared unusable. In some embodiments, the data record, or an identifier of the data record may be added to a list or database containing a number of other accounts that have also been declared unusable. An exemplary list or database may be included in, or part of, database 135 accessible by payment processing network 145. In some embodiments, database 135 may be accessed by FSP system 130 or computing components of payment processing network 145 to determine whether to authorize a received transaction request.

The exemplary embodiments are not limited to the above examples for updating a data record. Numerous other methods may be implemented to indicate a status of an account or change a status of an account, consistent with the disclosed embodiments. Additionally, in some embodiments, the updated status or indication may correspond to one or more "states" of the payment account. Thus, for example, a first indication may signify that the payment account is unusable, whereas a second indication may signify that the payment account is unusable unless one or more conditions or transaction rules are met. Numerous other "states" may be implemented to correspond to one or more other conditions or restrictions on a payment account.

In step 410, a request may be received from a user 110 or user device 112, to temporarily register or enable a payment account for use in a transaction. The received request may be similar to that generated in step 320 described with respect to FIG. 3. The received request may include a user or account identifier and various other parameters associated with the request and the requested transaction. For example, in some embodiments, the received request may include the name of a merchant or an identified (general or specific) location of an anticipated transaction, location information of a user, a window of time for initiating the transaction, or other information that may be related to a transaction, such as an anticipated amount of the transaction, etc. Other information associated with the received request may include an identifier of user device 112 and authentication credentials of a user 110 or user device 112.

In some embodiments, the received request may include additional information indicating that the anticipated transaction is an e-commerce type of transaction, as well as information identifying the e-commerce web-site and information identifying a device to be used for the transaction. E-commerce type transactions may be more susceptible to fraudulent behavior, thus in some embodiments, more specific information regarding an anticipated transaction may be received in a request to temporarily register a payment account for use in an e-commerce transaction.

In some embodiments, a payment account associated with the request received in step 410 may be updated, similar to that described in step 405 above, to change a status indicator to indicate that use of the payment account is to be limited based on at least one transaction rule.

In step 420, a transaction rule may be associated with a payment account, the transaction rule being based at least in part on the information received in the request of step 410. In some embodiments, the transaction rule may include some of the information received in the request of step 410. The particular payment account with which to associate the transaction rule may be determined based on a user or account identifier received in the request. The identified payment account, or a list or database containing an identifier of the payment account, may then be updated, similar to the method described above with respect to step 405, to associate the temporary transaction rule with the payment account. For example, in some embodiments, a status indicator corresponding to a payment account may be updated or changed to reflect that the payment account is associated with a transaction rule. Additionally, in some embodiments a data record associated with the payment account may be updated to include the transaction rule or an indication of one or more transaction rules. In other embodiments, a separate list or database may be generated to include identifiers of payment accounts associated with a transaction rule. Any number of other methods for associating a payment account with a transaction rule and identifying the payment account as being associated with a transaction rule are contemplated by the present disclosure.

In some embodiments, an exemplary transaction rule may include a location-based rule and/or a time-based rule. Other rules based on an amount of a transaction or frequency of a transaction may also be implemented according to the disclosed embodiments. An exemplary location-based rule may include a defined geographical area for which a transaction may be authorized. The geographical area may be dynamically generated based on a number of factors including the nature of the geographical area, and a reliable accuracy of received user location data within some range of error. For example, in an urban environment, where a precise user location may be difficult to obtain, a larger geographical area may be defined for a transaction rule. In other embodiments, where a precise location of a merchant may be difficult to obtain, such as, for example, where the merchant is a booth at a craft fair, or other large area venue where merchant spaces are undefined, it may be beneficial to define the geographical area according to the general location of the venue. In other embodiments, however, where a precise merchant and user location may be obtained, a defined geographical area may be narrowly focused to encompass an area with the granularity of a particular cashier or kiosk. In some embodiments, the geographical area may be defined based on an overlay of a map regarding the received location information, where the map details may be used to define a suitable geographical area.

In some embodiments, the definition of a geographical area may be based on information received in the request at step 410. For example, where user 110 identifies a particular merchant in the request, the geographical area for the transaction rule may be limited to the geographical area of a merchant. In other embodiments, where the request received in step 410 includes a then current location of a user 110, the geographical area for the transaction rule may be determined based on a predefined or dynamically chosen radius of the user's 110 then current location. In other embodiments, the geographical area may be based on a user's location determined at a time most near to the time of initiating a transaction. The above disclosure is by way of example only. A geographical area may be defined for a transaction rule based on any relevant information concerning a transaction, A transaction rule consistent with disclosed embodiments may also include a time-based rule defining a window of time in which a transaction may be authorized for a payment account. Similar to the above, a window of time may be predefined or may be dynamically defined based on a number of factors. In some embodiments, the window of time defined for a transaction rule may be based on a user selected parameter received in the request in step 410, for example. In other embodiments, the window of time may be based on the nature of a determined location, such as a mall or other venue where multiple transactions may be initiated in a relatively short period of time. A time-based rule may define the window of time to range from an hour or more to just minutes or less. As discussed above, a time-based rule may also be defined to be limited to a single, imminent transaction, such that a user may request to temporarily register their payment account for use in the transaction just moments before initiating the transaction. Other factors for defining a time-based transaction rule are contemplated by the present disclosure.

In some embodiments, a similar time-based rule may alternatively be implemented as an update to a payment account record to declare the account unusable, as similarly described in step 405 and with respect to 410. For example, a particular status indicator may be associated with the payment account based on a time-based rule. The time-based rule may be associated with the request to temporarily register the payment account for use in a transaction. In some embodiments, for example, a status indicator indicating that use of the payment account is limited by a transaction rule may be associated with the account for a window of time after receipt of the request to temporarily register the payment account. Thus, in some embodiments, outside the applied window of time, a payment account may otherwise be associated with a status indicator declaring the account unusable. Whereas, within the window of time defined by the time-based rule, a status indicator may indicate that the payment account is associated with one or more transaction rules.

Returning to FIG. 4, in step 430, FSP system 130 and/or other systems provided as part of payment processing network 145 may receive transaction data associated with a transaction authorization request. In some embodiments, merchant system 120 may generate the transaction authorization request upon initiation of a transaction by user 110. Merchant system 120 may then transmit the transaction authorization request to payment processing network 145 for authorization. As discussed above, payment processing network 145 may include a number of systems associated with processing, clearing, and settling a transaction. The transaction data received in step 430 may be analyzed by one or more systems provided as part of payment processing network 145 to determine the payment method or account used to initiate the transaction. One or more of the systems associated with payment processing network 145 may perform certain pre-authorization and authentication checks on the payment method and account presented by user 110 before presenting the transaction authorization request to the user's financial service provider associated with the payment account.

In some embodiments, the transaction data received in step 430 may include information related to the nature of the transaction, a timestamp of the transaction, an amount of the transaction, a user or account identifier, merchant identifier, and merchant location information, as well as any other related information. Merchant location information may include any information relevant to determining a geographic location of a merchant. In some embodiments, merchant location information may include geographic location information identifying the general location of the merchant, whereas in other embodiments, merchant location information may be provided to identify the geographic location of a particular payment terminal at merchant system 120. In some embodiments, such as where a transaction is initiated remotely from a physical location of a merchant via a web-site or other e-commerce type of transaction, an IP address of the computing device used to initiate the transaction may be included as part of transaction data. The IP address may be used to verify a location of the origination of the transaction request. Other network identifiers may also be used to determine a location of the device initiating a transaction.

In step 440, FSP system 130 and/or other systems provided as part of payment processing network 145 may receive location information of a user associated with the payment account. As similarly detailed above with respect to step 330 in FIG. 3, location information may be received from user device 112 or payment card 114. Location information for user 110 may also be transmitted by merchant system 120 as determined by one or more location sensing devices present at the place of a transaction. Thus, in some embodiments, the location information may be received along with the transaction data associated with a transaction authorization request in step 430. In some embodiments, location information may also be received along with the request to temporarily register a payment account for use in a transaction as part of step 410. In other embodiments, location information may be periodically received after the request to temporarily register a payment account of step 410. Thus, in some embodiments, location information of a user may also be received by FSP system 130 before receipt of the transaction authorization request in step 430.

In some embodiments, FSP system 130 may store the received location information of a user 110 in association with an account record or other record associated with the payment account of the user 110. In some embodiments, the received location information may include a user or account identifier to enable FSP system to identify the user 110 corresponding to the received location information. The received location information may be associated with an account record stored as client data 234 in memory 230, or in databases 240, 135. The stored location information may include any information for designating a user's 110 then "current" location. In some embodiments, location information may be received on a periodic or frequent bass. In these embodiments, FSP system 130 may continuously update one or more account records to include the updated location information of user 110.

In step 450, FSP system 130 and/or other systems provided as part of payment processing network 145 may determine whether to authorize the transaction or approve the transaction authorization request based at least in part on the associated temporary transaction rule of step 420, the transaction data received in step 430 and the location information received in step 440. As discussed above, the temporary transaction rule and the location information may be associated with a payment account as part of a payment account record or other list or database including payment account information. The payment account record or other information may be stored in database 135, which may be updated by FSP system 130 to include the payment account information. In some embodiments, database 135 may be provided as part of payment processing network 145. In some embodiments, one or more systems provided as part of payment processing network 145, upon receipt of the transaction authorization request, may access database 135 to determine whether to authorize the transaction based on the transaction rule and location information. In other embodiments, a transaction authorization request may be received by FSP system 130, which may then determine whether to authorize the transaction based on the transaction rule and location information stored in association with a payment account record in database 135.

As part of step 450, FSP system 130 and/or other systems provided as part of payment processing network 145 may first determine whether a payment account associated with the received transaction request has been previously declared unusable or otherwise identified with a flag or other status indicator, as discussed above with respect to step 405. In some embodiments, payment account information received as transaction data in step 430 may be compared against a list of unusable or flagged payment accounts stored in database 135. In other embodiments, an account record associated with the payment account may be searched to determine whether the account has been flagged or declared unusable. Any number of other methods may also be used to search and locate information associated with the payment account to determine whether there are any restrictions limiting the use of the payment account for the transaction.

In some embodiments, upon determining that the payment account has been declared unusable, or has been flagged with a status indicator, the payment account information may be analyzed to determine whether the account is associated with a transaction rule. Any identified transaction rule, transaction data, and location information may be analyzed to determine whether to authorize the transaction. Other information received in the request to temporarily register a payment account for use in a transaction (step 410), may also be used in a determination to authorize the transaction.

In some embodiments, one or more transaction rules may be applied according to a priority associated with the transaction rule. For example, in some embodiments, a time-based rule may be applied first to determine whether a timestamp of the transaction is within the window of time defined by a time-based rule discussed above. Assuming the time-based rule has been satisfied, the location-based rule may be analyzed to determine whether the location information received for user 110 matches location information of the merchant, as defined by the location-based rule.

In step 450, location information of a user 110 may be compared with location information of a merchant received as transaction data associated with the transaction authorization request. In some embodiments, a comparison may be made based on the nature of the geographic area defined for the transaction. For example, as discussed above, a geographic area may be defined based on a merchant location. In this example, a comparison may be made to determine whether the location information received from user 110 corresponds to the merchant location within a predetermined threshold. In other embodiments, where the geographic area is defined based on non-merchant specific location coordinates, a comparison may be made to determine whether the location information received from user 110 corresponds to a location within a defined surrounding area of the geographic location. In some embodiments, a map and/or map data may be consulted to determine whether a particular user location corresponds to a predefined merchant location.

Based on a comparison between the transaction rule, transaction data, and location information, a determination may be made whether to authorize the transaction. A result of the comparison may include a determination that an authenticated user is in the same (specific or general) location as the point of the transaction initiation. Thus, according to the disclosed embodiments, FSP system 130 may be confident that the transaction is not fraudulent and authorize the transaction notwithstanding a previous determination to declare the payment method or account unusable. In step 460, an authorization decision may be transmitted to merchant system 120, enabling merchant system 120 to complete the transaction with user 110.

In some embodiments, the temporary transaction rule associated with the payment account in step 420, may be applied for only a single transaction. Thus, in some embodiments, after determining whether to authorize the transaction in step 450, FSP system 130 may disassociate the transaction rule with the payment account and/or update a flag or status indicator associated with the payment account to once again declare the payment account unusable, for example. In other embodiments, the temporary transaction rule may remain associated with the payment account based on a time-based rule discussed above. Thus, in some embodiments, one or more transactions may be initiated by a user 110 using a payment account based on a single request to temporarily register the payment account for use in a transaction, The embodiments discussed above with respect to FIG. 4 relate to an "active" implementation in which a user actively requests to temporarily register a payment account for use in a transaction. Other embodiments are contemplated, however, in which a user may continue use of a payment account that has otherwise been flagged or declared unusable, based on a passive transmission of location information. An exemplary process 500, based on a "passive" implementation is discussed in further detail below with respect to FIG. 5.

Figure 5:
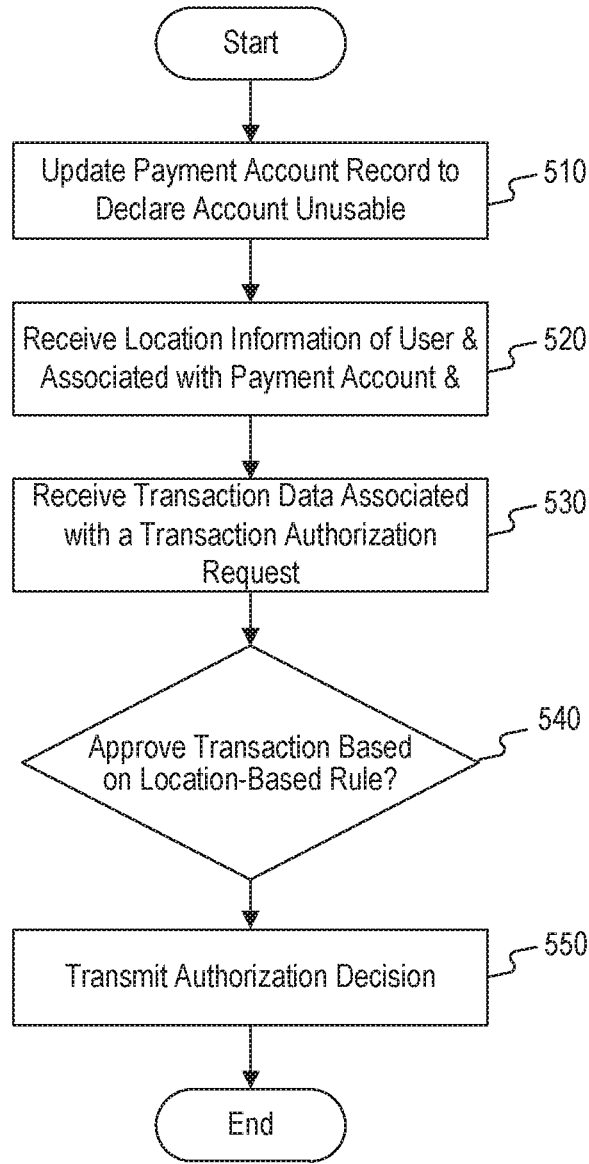
FIG. 5 is a flowchart of an exemplary authorization process for authorizing a transaction, consistent with the disclosed embodiments.

As shown in FIG. 5, FSP system 130 and/or other systems provided as part of payment processing network 145 may update a payment account record to declare the account unusable (step 510). Step 510 may be substantially similar to step 405 detailed above with respect to FIG. 4. Additionally, steps 520 and 530 may also be substantially similar to the corresponding steps 440 and 430, respectively. Similar to the discussion with respect to FIG. 4, in some embodiments, the ordering of steps 520 and 530 may also be reversed. In steps 520 and 530, FSP system 130 and/or other systems provided as part of payment processing network 145 may receive location information of a user associated with a payment account, as well as transaction data associated with a transaction authorization request for a transaction initiated using the payment account.

Process 500 differs from process 400 by the omission of a step to request registration to temporarily register a payment account for use in a transaction, similar to step 410 in FIG. 4. In process 500, a user 110 need not submit such a request. Instead, FSP system 130 and/or other systems provided as part of payment processing network 145 may passively receive location information transmitted by user device 112 or payment card 114. In some embodiments, an app executed on user device 112 may be configured to periodically transmit location information to FSP system 130 without user intervention. In some embodiments, FSP system 130 may monitor location information of a user associated with user device 112 or payment card 114 and update an account record to include the location information, consistent with the above-described embodiments. As similarly described above with respect to step 330 in FIG. 3, user device 112, or payment card 114, may also be configured to passively transmit location information based on an "activation" signal received from one or more location sensing devices provided as part of merchant system 120, or elsewhere. In some embodiments, user 110 may authenticate user device 112 or payment card 114 to verify a user's association with the device.

Upon receiving transaction data associated with a transaction authorization request (step 530), FSP system 130 and/or other systems provided as part of payment processing network 145 may determine whether to authorize the transaction or approve the transaction authorization request based on a location-based rule (step 540). FSP system 130 and/or other systems provided as part of payment processing network 145 may first determine whether the transaction data is associated with a payment account for which a location-based rule applies. In some embodiments, such a determination may be based on an indicator associated with the payment account, as similarly described above with respect to FIG. 4.

In some embodiments, an exemplary location-based rule may be similar to those described above with respect to step 420. In these embodiments, the location-based rule may be predefined or otherwise based on the location information received from user device 112 or payment card 114 in step 520. For example, in some embodiments, the location-based rule may define a geographic area of a predetermined size or a size based on user's 110 current location information.

Additionally, in some embodiments, an exemplary location-based rule may be generated and associated with a payment account based on prior transaction history of a user 110 using the account. In some embodiments, FSP system 130 may access client data 234 and other transaction data 232 associated with a user account to generate one or more rules based on merchants or transactions, or patterns of transactions identified in prior transaction history. In some embodiments, client data 234 includes location information associated with the prior merchants and transactions. A transaction rule may be generated to define an association of one or more merchants, transactions, locations, and/or time of day that may indicate a "safe" transaction despite a payment method or account that may have been previously declared unusable.

For example, when a history of transaction data indicates that a user 110 has a reasonably consistent pattern of picking up groceries after work two or three times per week at a particular merchant location, a transaction rule associated with the merchant and merchant location, and/or time of day, may be generated and associated with the user's payment account. Myriad other "safe" transaction patterns are contemplated by the present disclosure. In some embodiments, a "safe" transaction may additionally be defined based on a transaction amount. A transaction rule may be generated to enable authorization of a transaction under a certain transaction amount, such as $25 or less, for example. In some embodiments, the parameters of a "safe" transaction may be displayed to user 110, via user device 112, for example, enabling user 110 to confirm and/or modify the parameters. Additionally, in some embodiments, a user's 110 transaction history may also be displayed to user 110, thus enabling the user to identify and select certain transactions to declare those transactions as "safe" transactions. FSP system 130 may then associate a "safe" transaction rule with the user's account based on the user's selection.

As part of step 540, FSP system 130 and/or other systems provided as part of payment processing network 145 may access database 135 to retrieve account information of a payment account associated with a transaction authorization request received in step 530. In some embodiments, any information relevant for an authorization determination may be stored in and accessed from database 135, consistent with the disclosed embodiments. For example, in some embodiments, one or more transaction rules and location information associated with a payment account may be retrieved from database 135 to aid in the determination. FSP system 130 and/or other systems provided as part of payment processing network 145 may then determine whether to approve a transaction authorization request based on a comparison between received transaction data and the one/or more location information and transaction rules.

As similarly described with respect to step 450 in FIG. 4, FSP system 130 and/or other systems provided as part of payment processing network 145 may determine whether to authorize the transaction based on a comparison between a merchant location received in the transaction data and "current" location information of a user 110 retrieved from database 135. In some embodiments, a transaction may be approved when it is determined that the user's 110 location is within a geographical area defined relative to the received merchant location information. In other embodiments, a comparison may alternatively be made to determine whether the merchant location is within a geographical area defined relative to the user's current location. An authorization decision may generally be based on a determination that user 110 is located in the same (general or specific) location as the merchant with which a transaction is initiated.

Additionally, an authorization decision may be based on other comparisons of a user's current location, the merchant's location, and other transaction data with respect to one or more other transaction rules regarding a "safe" transaction. For example, in some embodiments, the authorization decision may be based on a determination that the transaction data is consistent with prior transactions entered into by user 110, including an identification of a particular merchant location and/or time of day. Other transaction rules and authorization decisions are contemplated by the present disclosure, which is not limited by the above examples.

In step 550, FSP system 130 and/or other systems provided as part of payment processing network 145 may transmit an authorization decision to merchant system 120, similar to the described in step 460 above. Upon receipt of an approved authorization system, a merchant may complete the transaction with user 110.

While the above disclosed embodiments determine whether to authorize a transaction based on a user's location information received or otherwise available at the time of receiving a transaction authorization request, in some embodiments, FSP system 130 may be configured to request then "current" location information from a user 110 upon receipt of a transaction authorization request. For example, in some embodiments, a user 110 may receive a notification from FSP system 130 to provide location information to enable authorization of the transaction. In some embodiments, the notification may be received via an app executed on user device 112. An exemplary app of the disclosed embodiments may then query the user to provide location information, or in some embodiments, may be configured to provide location information automatically in response to a received request. In some embodiments, a user 110 may be required to pre-authorize the app to automatically transmit location information to FSP system 130.

Furthermore, in some embodiments, any of the disclosed methods and systems may be implemented as an additional layer of security for authorizing certain transactions, whether or not a payment account has been declared unusable. For example, transactions above a certain amount, or with certain merchants deemed potentially fraudulent, may require verification of a user's location vis-a-vis the location of an initiated transaction, as disclosed in the above embodiments. In these embodiments, a user may actively or passively provide location information for a transaction authorization request, and may also provide location information in response to a request to do so from FSP system 130, for example.

User interaction in the above examples, and particularly with respect to FIG. 3 for generating a request for a temporary transaction authorization may be enabled using an interface of an application developed for download to mobile communications and computing devices, e.g., laptops, mobile computers, tablet computers, smart phones, etc. The application may be made available for download by the user either directly from the device, through a website, or through a dedicated application store. An exemplary interface illustrating aspects of the disclosed methods is shown in FIG. 6.

Figure 6:
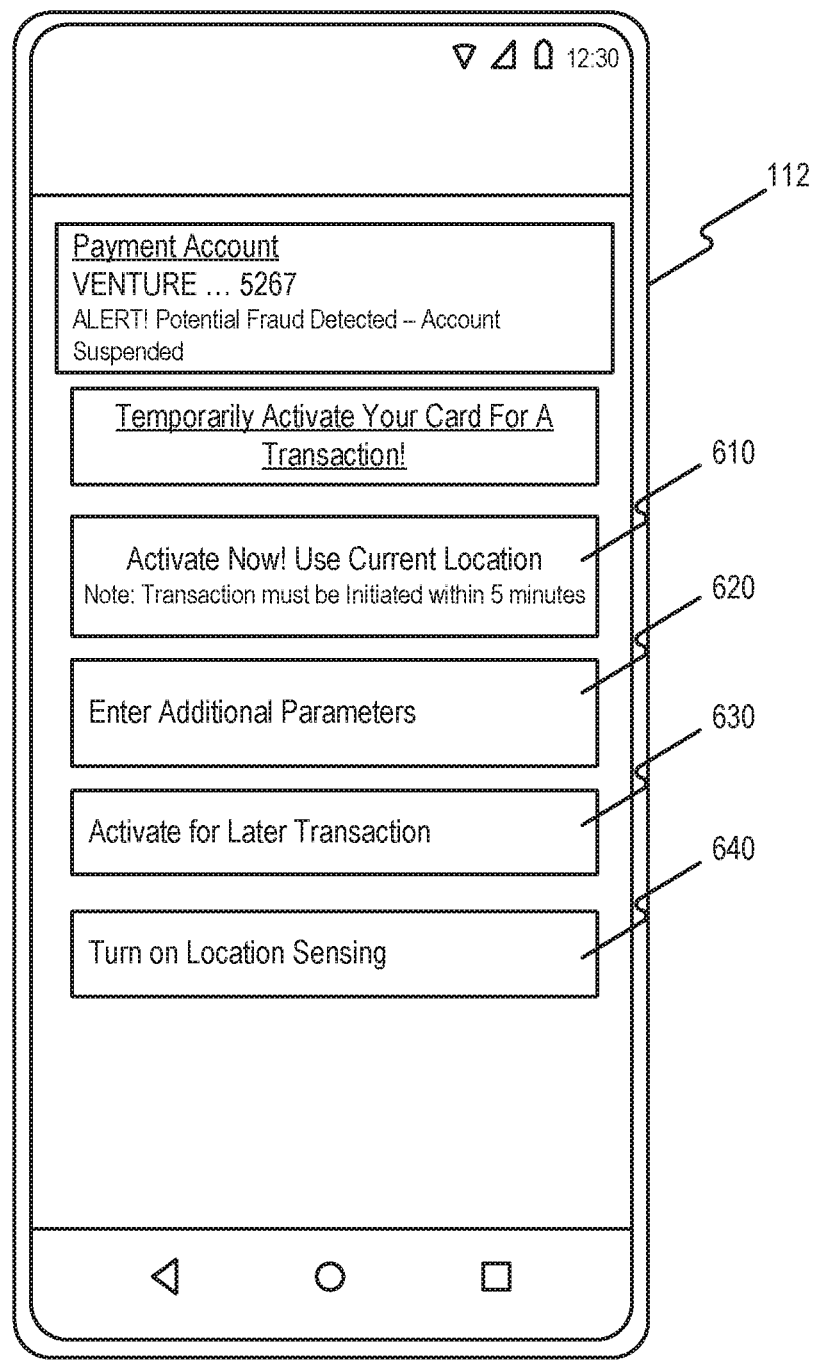
FIG. 6 is an example of a user device interface enabling a request for a temporary transaction authorization, consistent with the disclosed embodiments.

FIG. 6 depicts an interface, according to one embodiment, that may be used to display a request temporary transaction authorization for a payment account that have been declared unusable, as similarly described with respect to step 320 shown in FIG. 3. The interface may be provided on a user device 112, which according to the illustrated embodiment, may be a smartphone. The interface shown may be part of a financial service provider application through which a user may access and modify various personal account information. An exemplary interface may include a plurality of windows or regions, some of which identify an account number and indicate that the account has been identified as being a victim or fraud or potential fraud or is otherwise declared unusable.

Additionally, a first region 610 may include a selectable display from which user 110 may quickly select to immediately activate the payment method and/or account using a current location. As shown, region 610 may display that a transaction must be initiated within a particular window of time, such as 5 minutes. Step 320 described above with respect to FIG. 3 may be executed upon selection of region 610. Other regions may also be displayed, such as region 620 that may be selectable to enable user 110 to enter additional parameters for a temporary transaction authorization request, such as an increased window of time, or an enlarged geographic area. For example, such parameters may be convenient where a user expects to make more than one purchase at a general location within a period of time. Region 630 may also be selectable to activate a later transaction and may require user 110 to identify a particular merchant, or time of day for an anticipated transaction, for example. An additional region 640 may enable a user to turn on location sensing to enable passive transmission of location information, for example, as described above with respect to process 500.

Figure 7:
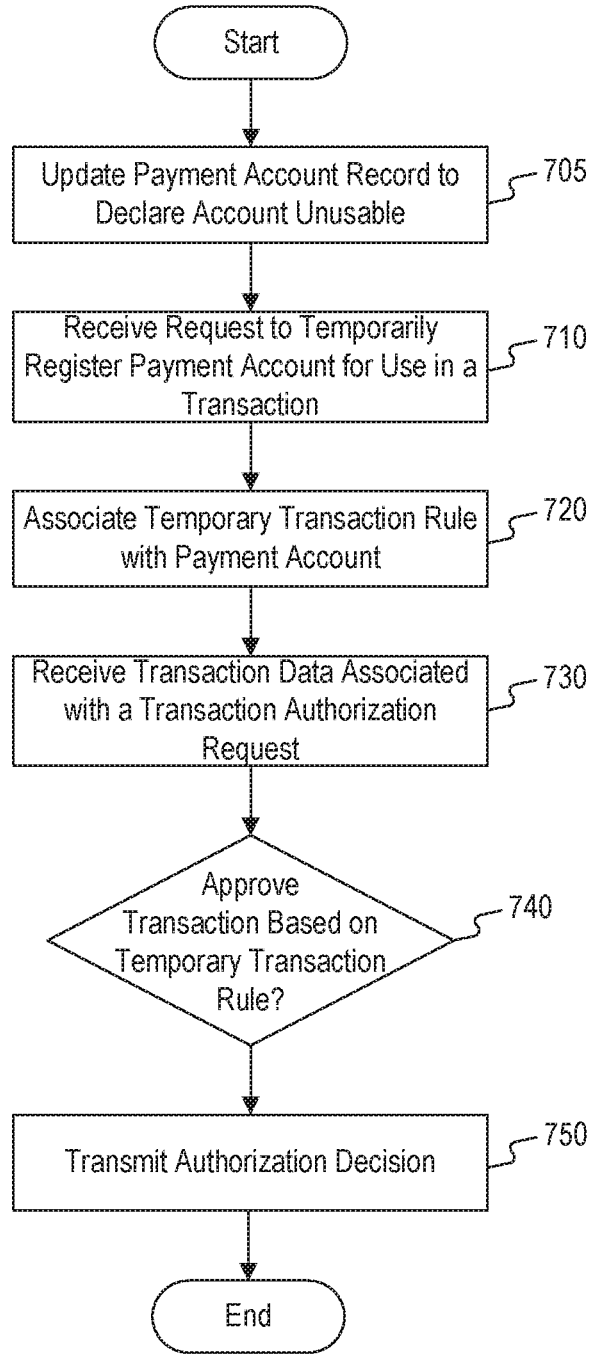
FIG. 7 is a flowchart of an exemplary authorization process for authorizing a transaction, consistent with the disclosed embodiments.

FIG. 7 is a flowchart of an exemplary authorization process 700 for authorizing a transaction based on temporary transaction rule, (e.g., a time-based transaction rule), consistent with the disclosed embodiments. Process 700, or aspects thereof, may be performed by FSP system 130 and/or other systems provided as part of payment processing network 145.

As shown in FIG. 7, FSP system 130 and/or other systems provided as part of payment processing network 145 may update a payment account record to declare the account unusable (step 705). The payment account record may include one or more records associated with FSP system 130 and one or more records associated with payment processing network 145. Step 705 may be substantially similar to step 405 detailed above with respect to FIG. 4. Additionally, steps 710, 720, and 730 may also be substantially similar to the corresponding steps 410, 420, and 430, respectively. In steps 710 and 720, for example, FSP system 130 and/or other systems provided as part of payment processing network 145 may receive a request from a user or user device to temporarily register a payment account for use in a transaction and may associate a temporary transaction rule with the payment account. The temporary transaction rule may be associated with a record for the payment account at FSP system 130 and/or other systems provided as part of payment processing network 145. In step 730, FSP system 130 and/or other systems provided as part of payment processing network 145 may receive transaction data associated with a transaction authorization request for a transaction initiated using the payment account declared unusable in step 705. In some embodiments, the temporary transaction rule of step 720 may include a time-based rule, defining a window of time in which the authorization request received in step 730 may be authorized for approving a transaction using the payment account.

After receiving transaction data associated with a transaction authorization request (step 730), FSP system 130 and/or other systems provided as part of payment processing network 145 may determine whether to authorize the transaction or approve the transaction authorization request based on the temporary transaction rule (step 740). For example, in some embodiments, FSP system 130 and/or other systems provided as part of payment processing network 145 may determine whether to authorize the transaction or approve the transaction authorization request based on the time-based rule. In some embodiments, FSP system 130 and/or other systems provided as part of payment processing network 145 may first determine whether the transaction data is associated with a payment account for which a time-based rule applies. In some embodiments, such a determination may be based on an indicator associated with the payment account, as similarly described above with respect to FIG. 4. In some embodiments, the indicator may be associated with the payment account at one or more systems provided as part of payment processing network 145. The indicator may function to override an automatic denial of the transaction authorization request at payment processing network 145 based on the determination of fraud or possible fraud, and instead, directs payment processing network 145 to forward the transaction authorization request to FSP system 130 to determine whether to authorize the transaction or approve the transaction authorization request based on the time-based rule associated with a payment account at FSP system 130.

In some embodiments, an exemplary time-based rule may be similar to those described above with respect to step 420. In certain embodiments, the time-based rule may be pre-defined, such as to correspond to a window of time of a predetermined number of minutes. In some embodiments, the transaction rule may be associated with the payment account for a predefined period of time corresponding to a window of time defined by the time-based rule. For example, the rule may be associated with the payment account for a 20 minute window of time, as defined by the time-based ruled. In some embodiments, the time-based rule may be dynamic (as described above) based on one or more factors (e.g., location based factors).

Additionally, in some embodiments, an exemplary time-based rule may be generated and associated with a payment account based on prior transaction history of a user 110 using the account. In some embodiments, FSP system 130 may access client data 234 and other transaction data 232 associated with a user account to generate one or more rules based on merchants or transactions, or patterns of transactions identified in prior transaction history. In some embodiments, client data 234 includes time-based information associated with the prior merchants and transactions. A transaction rule may be generated to define an association of one or more merchants, transactions, locations, and/or time of day that may indicate a "safe" transaction despite a payment method or account that may have been previously declared unusable.

As part of step 740, FSP system 130 and/or other systems provided as part of payment processing network 145 may access database 135 to retrieve account information of a payment account associated with a transaction authorization request received in step 730. In some embodiments, any information relevant for an authorization determination may be stored in and accessed from database 135, consistent with the disclosed embodiments. For example, in some embodiments, one or more transaction rules associated with a payment account may be retrieved from database 135 to aid in the determination. FSP system 130 and/or other systems provided as part of payment processing network 145 may then determine whether to approve a transaction authorization request based on a comparison between received transaction data and one or more transaction rules associated with the payment account.

As similarly described with respect to step 450 in FIG. 4, FSP system 130 and/or other systems provided as part of payment processing network 145 may determine whether to authorize the transaction based on the time-based transaction rule. For example, FSP system 130 and/or other systems as part of payment processing network 145 may initiate, responsive to the request received in step 710, a timer associated with a duration of the window of time during which a payment account may be temporarily activated or unlocked for use in a transaction. After initiating the timer, FSP system 130 and/or other systems may determine whether to authorize the transaction based on whether the transaction occurred before the duration of the window of time (or the timer) has elapsed. In some embodiments, the timer is initiated by FSP system 130 and an authorization determination decision is made without involvement of payment processing network 145. By placing configuration and control of a transaction rule, such as a time-based transaction with FSP system 130, FSP system 130 is afforded an opportunity to exact fine-grained control over authorization decisions for a payment account based on or more transaction rules.

In step 750, FSP system 130 and/or other systems provided as part of payment processing network 145 may transmit an authorization decision to merchant system 120, similar to that described in step 460 above. In some embodiments, FSP system 130 may transmit an authorization decision to the payment processing network, which then may perform one or more checks on the payment account before transmitting the authorization decision to merchant system 120. Upon receipt of an approved authorization system, a merchant may complete the transaction with user 110.

Additional exemplary interfaces illustrating aspects of the disclosed methods are shown in FIGS. 8A-8D. FIGS. 8A-8D depict a series of interfaces, (e.g., a user device interface), according to some embodiments, to display one or more features that allow a user to request temporary transaction authorization for a payment account that has been declared unusable, as similarly described with respect to step 320 shown in FIG. 3. The interfaces, FIGS. 8A-8D, may be provided on a user device 112, which according to the illustrated embodiment, may be a smartphone. The interface shown may be part of a financial service provider application executed on the user device through which a user may access and modify various personal account information. An exemplary interface may include a plurality of windows or regions, some of which identify an account number and indicate that the account has been identified as being a victim of fraud or potential fraud or is otherwise declared unusable.

Figure 8A:
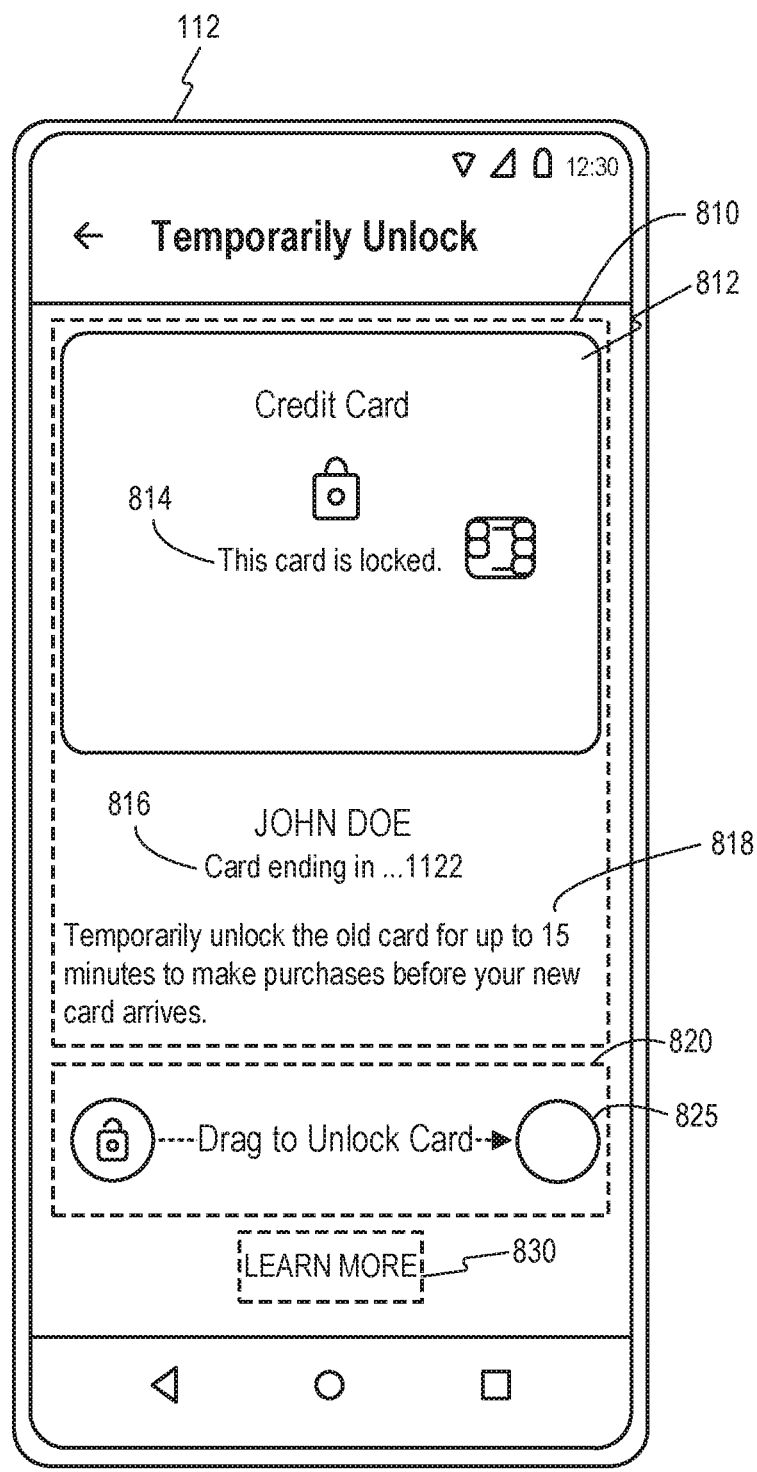
FIGS. 8A-8D are examples of a user device interface that enables a request for a temporary transaction authorization, consistent with the disclosed embodiments.

FIG. 8A depicts a user device interface indicating that a payment account is in a locked state (e.g., declared unusable). The user device interface enables a request by a user of the device for a temporary transaction authorization (e.g., a request to activate or unlock a payment account) consistent with the disclosed embodiments. As shown in FIG. 8A, a first region 810 may include a selectable element from which user 110 may select information associated with a payment method. As shown, region 810 may display information concerning the payment method. This may include an image of the payment method 812 and/or text 816 associated with the payment method. In some embodiments, text 816 associated with the payment method may include account information, such as the name of account holder, financial service provider associated with account, account number, etc.

Additionally, region 810 may also include status information 814, which may indicate whether the card is usable or unusable (e.g., because of determined or reported fraud or potential fraud). For example, as depicted in FIG. 8A, status information may display that the payment method is unusable (e.g., "This card is locked.") Region 810 may also include a message 818 to instruct the user. For example, message 818 may instruct the user regarding the capability for or how to request to temporarily register the payment account, associated with the payment method, for use in a transaction (e.g., temporarily activate or unlock the payment account). In some embodiments, message 818 may provide a detail description to the user. Message 818 may, for example, describe to the user information concerning temporarily registering (e.g., activating or unlocking) the payment account, associated with the payment method, for use in a transaction.

As shown in FIG. 8A, a second region 820 may include an interactive and selectable display 825 from which user 110 may quickly select to immediately activate the payment method for use in a transaction (e.g., unlock the payment account). Selectable display 825 may include a selection mechanism. For example, as shown, a slider may be used as a selection mechanism. The slider may be used to drag an image displayed as part of selectable display 825 across region 820 to unlock or activate the payment method for use in a transaction. Other selection mechanisms may be used to activate the payment method; these selection mechanisms may include, for example, buttons, check boxes, radial, text boxes, text areas, input boxes, accordions, any combination thereof, or any other method for capturing a user interaction to activate the payment method. In some embodiments, a user may activate a payment method using other regions of the interface or through gestures, such as hand signals, eye movement, sound, or any other method that user device can interpret to activate the payment method.

As shown in FIG. 8A, a third region 830 may include a selectable element via which user 110 may selectively access additional information associated with a payment method or the capability for unlocking the payment method. As shown, third region 830 may be configured to display other information upon selection. This other information, such as "Learn More," may include a link to additional resources.

Figure 8B:
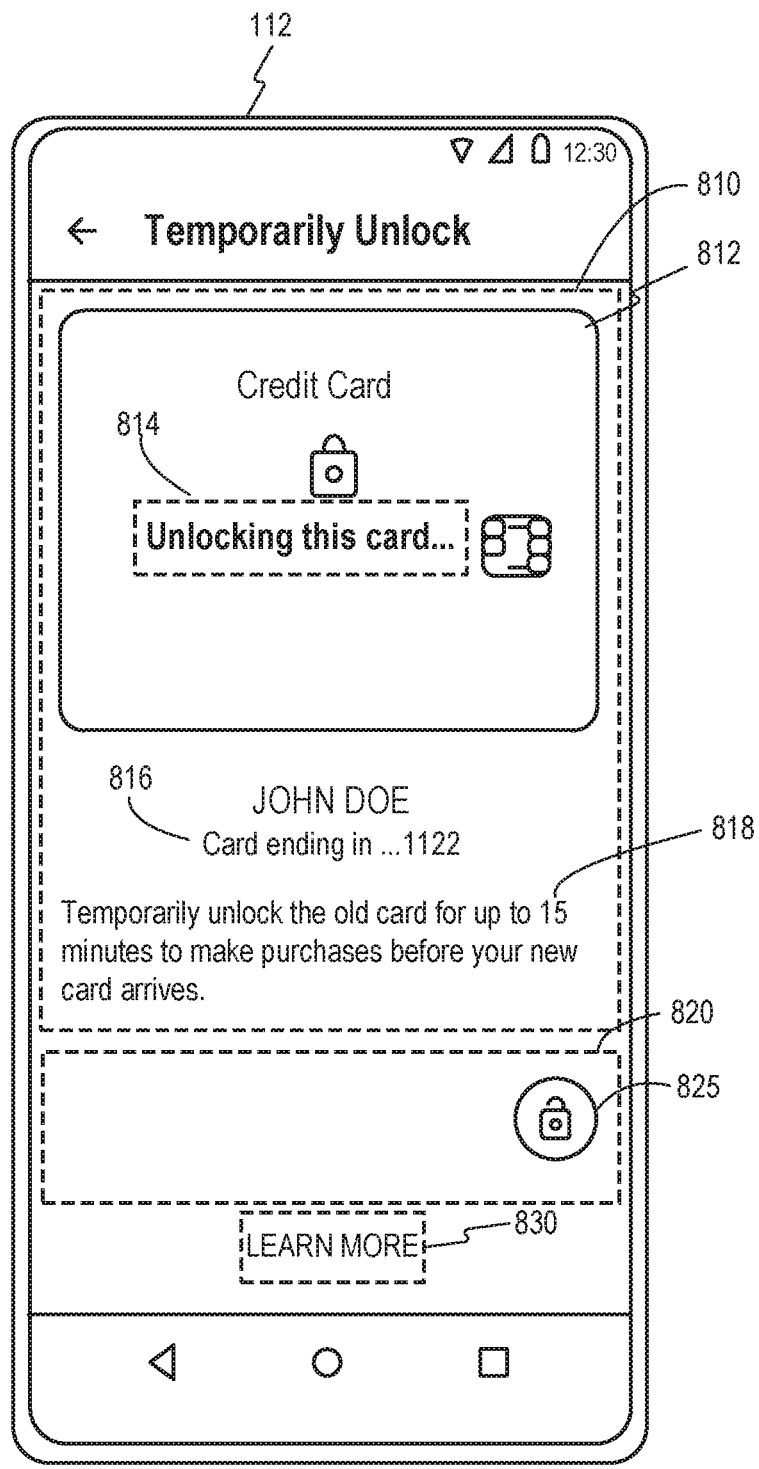

FIG. 8B depicts a user device interface indicating that a payment account is being configured to an unlocked or activated state during which the previously unusable payment account is made usable for a transaction. FIG. 8B illustrates an example display that may be responsive to a user request to temporarily register a payment account for use in a transaction (e.g., unlock the payment account), consistent with the disclosed embodiments. Many elements shown in FIG. 8B may remain the same as described above for FIG. 8A. However, some elements may change. For example, as shown in FIG. 8B, the selection mechanism (or slider) has been dragged across region 820 to activate (e.g., unlock) the payment method, such that it may be used to complete a transaction. In response to the selection mechanism (or slider) having been dragged across region 820 to activate the payment method, status information 814 has changed to indicate that the payment method is being unlocked (e.g., "Unlocking this card").

Figure 8C:
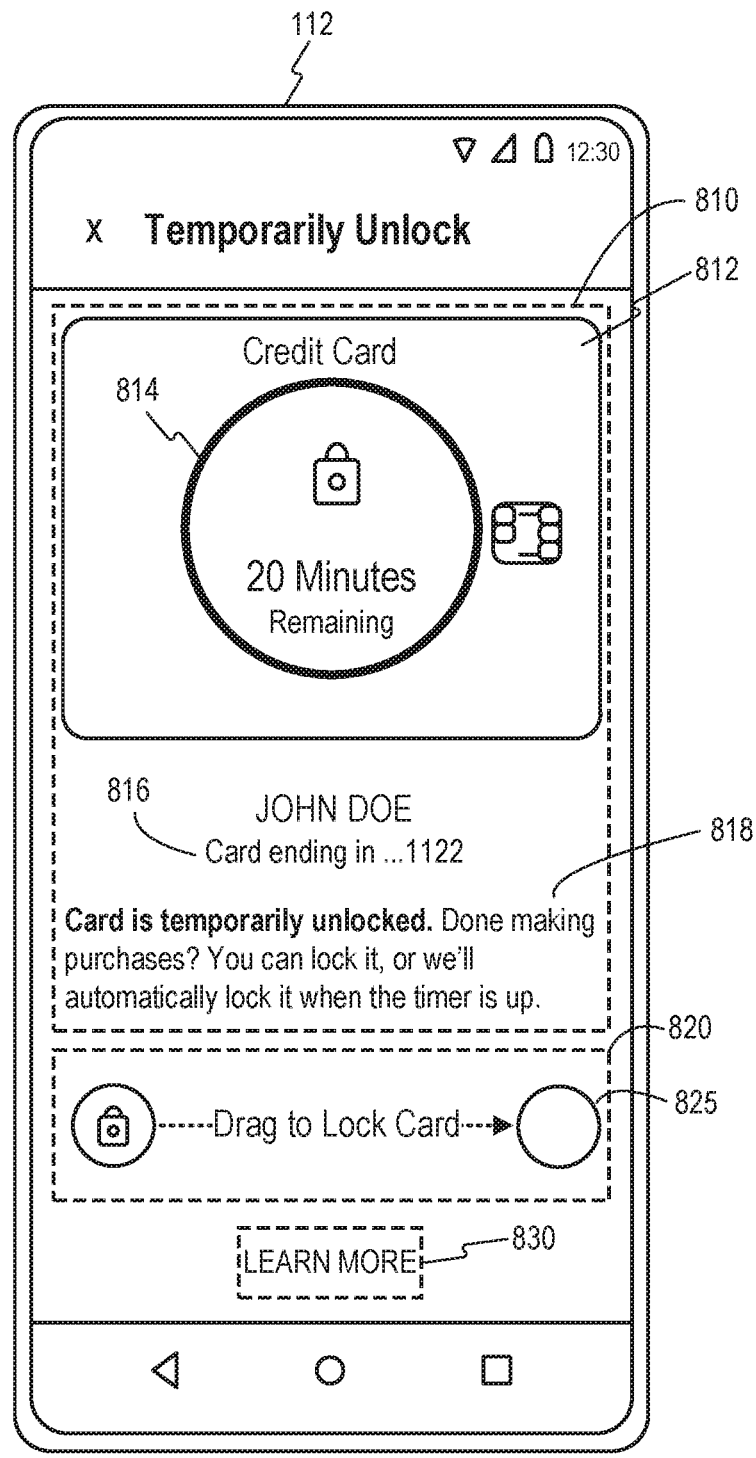
Figure 8D:
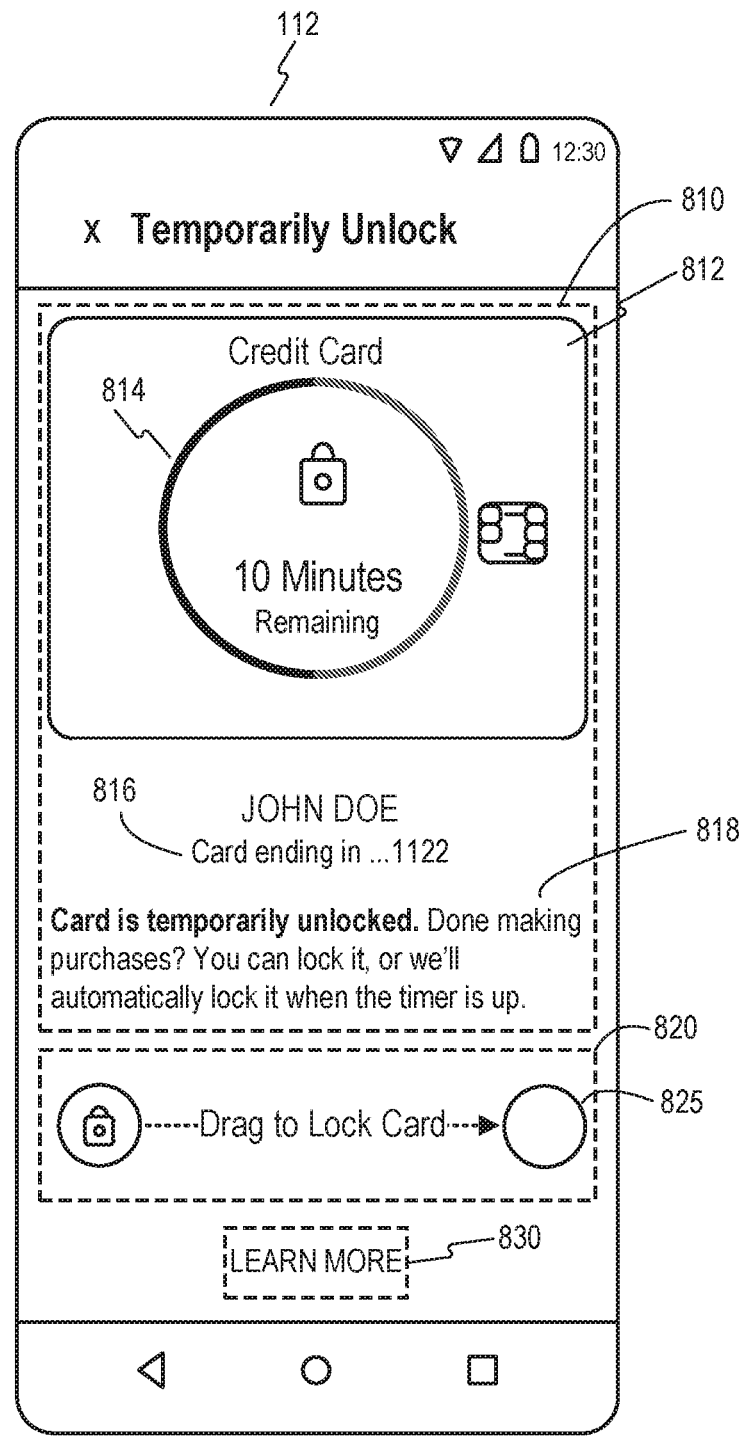

FIG. 8C is an example of a user device interface that may be displayed on a user device when a payment account is activated or unlocked to enable use of the otherwise disabled payment account in a transaction, consistent with the disclosed embodiments. User device 112 may display FIG. 8C after FSP system 130 has temporarily activated or unlocked the payment account, associated with the payment method, for use in a transaction, consistent with the disclosed embodiments. Many elements in FIG. 8C may remain the same as described above for FIGS. 8A and 8B. However, some elements may change. For example, as depicted in FIG. 8C, status information 814 has changed to include an indicator or indication associated with a time-based transaction rule for temporarily activating or unlocking the payment account. In some embodiments, as shown, the indicator may be indicative of a duration of a window of time in which the payment account is usable for a transaction. The indicator may provide information indicative of the number of minutes remaining in which the payment account is usable for a transaction. The indicator may include a dynamic countdown indicative of the remaining time in which the payment account is usable to complete a transaction. For example, when the indicator includes a circle, as shown in FIG. 8C, a marker may move around the circumference, or the circumference of the circle may change colors, to visually depict a percentage of the time remaining of the window of time, as shown in FIG. 8D. In some embodiments, a color of the circle may also change to be indicative of one or more subsets of periods of time. For example, as the remaining amount of time counts down, a color of the circle may transition from green to yellow to red to provide an alert to the user about a limited amount of time remaining. Thus, the visual depiction of the percentage of time or amount of remaining time may serve as the dynamic countdown. In addition, the indicator may also include information stating the time remaining (e.g., "20 minutes remaining"), duration of the window of time, etc. The information stating the time remaining may include a minute by minute countdown or a running timer, etc.

Also, as shown in FIG. 8C, message 818 may be updated to provide information indicating to the user that a payment method is activated or unlocked, and/or provide additional instructions indicating that the payment method or account will again be unusable upon expiration of a time-based rule or upon a user selecting to lock the account (e.g., disable the payment account for use in a transaction). In some embodiments, the selection mechanism (or slider) may change to denote that the payment method will be may be manually deactivated or disabled upon user selection of selectable display 825. For example, selectable display 825 may allow a user to selectively slide or drag an image displayed as part of selectable display 825 across region 820 to deactivate the payment method. In some embodiments, the selection mechanism of selectable display 825 can be used to deactivate the payment method at any time, even if the window of time associated with the time-based transaction rule has not closed.

Figure 9:
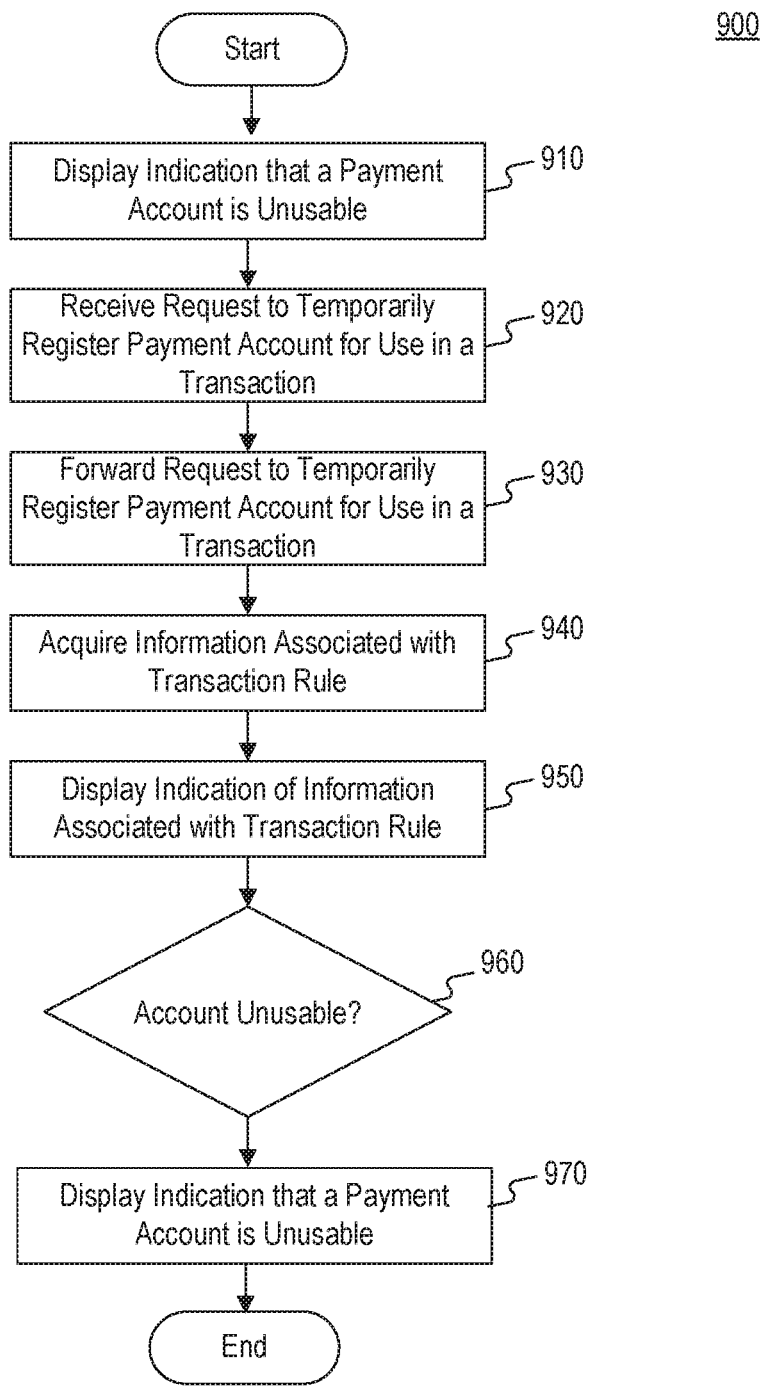
FIG. 9 is a flowchart of an exemplary process on a user device, consistent with the disclosed embodiments.

FIG. 9 depicts exemplary aspects of authorization process 900 that may be performed by user device 112 and/or FSP system 130 or other systems in payment processing network 145, consistent with the disclosed embodiments. Aspects of process 900 may be understood with reference to the example interfaces displayed on user device 112 as described above with respect to FIGS. 8A-8D.

In some embodiments, as shown with respect to FIG. 6 and FIG. 8A, an indication may be displayed to a user (e.g., via an interface of user device 112) that a payment account is unusable (e.g., has been suspended or disabled) (step 910). Such an indication may be displayed based on a reported, determined, or potential fraud, as detailed above. In some embodiments, upon disabling a payment account, FSP system 130 may provide instructions to user device 112 to display an interface that allows a user to temporarily register a disabled payment account for use in a transaction. In some embodiments, the interface may include capability for a user to first register or enroll in a service with FSP system 130 to provides the capability for a user to temporarily register their payment account (e.g., activate or unlock the payment account) via user device 112. When desiring to use a disabled payment account for a transaction, a user may interact with user device 112 to navigate to or receive an interface (e.g., as shown in FIG. 8A) that allows a user to temporarily register the payment account for use in a transaction (e.g., activate or unlock a payment method). As described above with respect to FIGS. 8A and 8B, user device may receive a request to temporarily register a payment account for use in a transaction, such as, for example, by receiving a signal indicative of the selection mechanism being dragged across region 820 to unlock or activate the payment method (step 920). User device 112 may forward this request to FSP system 130 and/or other systems provided as part of payment processing network 145 (step 930). In response to forwarding the request, user device 110 may acquire information associated with a transaction rule applied to the payment account, such as a time based transaction rule, as described above (step 940). FSP system 130 and/or other systems may send this information to user device 110 upon applying a transaction rule to the payment account. In some embodiments, FSP system 130 may associate or apply the transaction rule to the payment account without involvement of the payment processing network 145. The transaction rule may be a timed based transaction rule, and the information may include a timer associated with a duration of a window of time during which the payment method may be used for a transaction. The information may also include instructions to user device 112 to display an indicator that represents the number of minutes remaining in which the payment account is usable to complete a transaction, as described above with respect to FIG. 8C. It should be understood that user device 112 may display FIG. 8B during the completion of any of steps 920-940.

At step 950, user device 112 may display an indication of the information associated with the transaction rule. User device 112, at step 950, may display an example interface such as that described with respect to FIG. 8C. As shown, user device 112 may display status information 814 as an indicator that represents the number of minutes remaining in which the payment account is usable to complete a transaction. User device 110 may display the indicator as dynamic countdown. In some embodiments, the information associated with the time-based transaction rule may include a timer associated with a duration of the window of time. The timer associated with the duration of the window of time may be initiated by user device 112, FSP system 130, or other systems provided as part of payment processing network, and may be synchronized with a timer initiated by FSP system 130, for example. In some embodiments, user device 112, FSP system 130 and/or payment processing network 145 may synchronize the indicator displayed on user device 112 with the timer. In some embodiments, a timer or other indicator displayed on user device 112 may be based on information received in real-time from FSP system 130 associated with a timer initiated by FSP system 130.

At step 960, user device 112, FSP system 130, and/or payment processing network may determine that the account is no longer usable for a transaction, such as when a time-based rule has expired. In some embodiments, user device 112 may receive a message, from FSP system 130 and/or payment processing network 145, that the window of time has closed to provide an indication that the account is once again unusable. In order words, the message may indicate that there is no more time remaining in which the payment account is usable. In some embodiments, user device 112 may determine the account is unusable by determining that there is no more time remaining as indicated by the indicator displayed in FIG. 8C. If user device 112 determines that the account is unusable, user device 112 may display a subsequent interface, such as that shown in FIG. 8A, to enable a user to once again register a payment account for use in a transaction (step 970).

In some embodiments, FSP system 130 and/or other systems may store a timer that is synchronized with display indication on user device 112 to determine whether the account is unusable. In these embodiments, FSP system 130 and/or other systems may check the running timing to determine if there is any time remaining (i.e., or, in other words, that the window of time has closed) to determine that the account is unusable. While not depicted, FSP system 130 may transmit the determination to payment processing network 145 and/or a merchant system 120, using techniques similar to those described above in relation to step 750.

Figure 10:
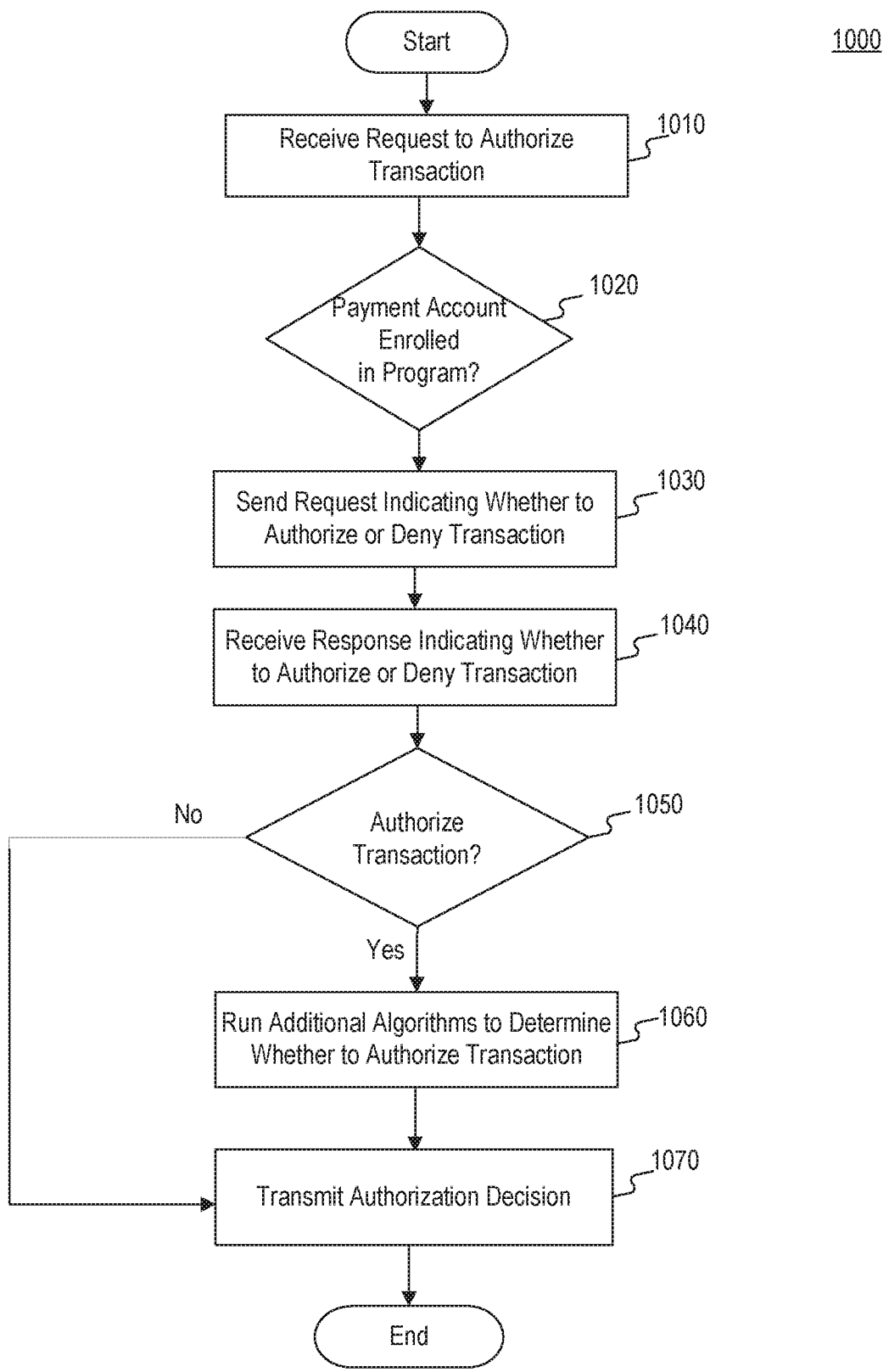
FIG. 10 is a flowchart of an exemplary authorization process device for authorizing a transaction, consistent with the disclosed embodiments.

FIG. 10 depicts an exemplary authorization process 1000 for authorizing a transaction using FSP system 130, and/or other systems provided as part of payment processing network 145. As shown in FIG. 10, payment processing network 145 may receive a request from merchant system 120 to authorize a transaction executed with a payment method that is associated with a payment account in fraud status (step 1010). For example, a record at payment processing network 145 associated with the payment account may be flagged or placed in fraud status based on a reported, determined, or possible fraud thereby disabling the payment account. Instead of automatically denying a transaction authorization request received for a disabled payment account, payment processing network 145 may determine, at step 1020, whether the payment account is enrolled in a program that allows for temporarily registering the payment account for use in a transaction. In some embodiments, for example, the payment account may be associated with an indicator that indicates whether the payment account is enrolled in a program that allows for temporarily registering the payment account for use in a transaction. The indicator may be associated with the payment account upon request of FSP system 130. FSP system 130 may instruct one or more systems of payment processing network 145 to associate such an indicator with a payment account upon FSP system 130 receiving user enrollment with a service for providing such capability, as described above. In some embodiments, FSP system 130 may instruct payment processing network 145 to associate such an indicator with the account upon receiving a request from a user (via user device) to temporarily register a disabled payment account for use in a transaction. In some embodiments, payment processing network 145 may acquire such an indicator from database 135, memory 230, or the like. In some embodiments, the indicator may function to override the automatic denial of a transaction request for a payment account in fraud status and instead directs the payment processing network to forward a received transaction authorization request (or information indicative thereof) to FSP system 130.

In some embodiments, in response to determining that the payment account is not enrolled in a program that allows for temporarily registering the payment account for use in a transaction, other systems provided as part of payment processing network 145 alone, or via FSP system 130, may send a request to user device 112 to enable enrollment in a program that allows for temporarily registering the payment account for use in a transaction (not shown), On the other hand, in response to determining that the payment account is enrolled in a program that allows for temporarily registering the payment account for use in a transaction, other systems provided as part of payment processing network 145 may send or forward the transaction authorization request or other request requesting FSP system 130 to provide an indication as to whether to authorize or deny the transaction (at step 1030).

As step 1040, payment processing network 145 may receive a response from FSP system 130 including an indication as to whether to authorize or deny the transaction using the payment account. Such a determination may be made by FSP system 130 based on the presence or enforcement of a transaction rule, such as a time-based transaction rule, as detailed above. For example, if the transaction authorization request is received within a window of time associated with a time-based rule for a payment account, FSP system 130 may return an indication to payment processing network 145 as to whether to authorize or deny the transaction, as described in detail above.

In some embodiments, one or more systems of payment processing network 145 may receive from FSP system 130 a response (e.g., an authorization decision) indicating whether to authorize or deny a transaction (step 1040). In some embodiments, FSP system 130 may complete one or more steps as depicted in FIG. 7 to send the authorization decision to payment processing network 145. In some embodiments, other systems provided as part of payment processing network 145 may determine whether the authorization indicates that the transaction should be authorized (step 1050). If the indication received from FSP system 130 indicates that the transaction should be denied, payment processing system 145 may deny the transaction authorization request and transmit the denial to a merchant system 120 (step 1070). If the authorization decision indicates that the transaction may be or should be authorized, payment processing network 145 may authorize the transaction and transmit an authorization decision to merchant system 120. In some embodiments, payment processing network 145 may run additional algorithms to ensure that the transaction should be authorized (step 1060) based on one or more other techniques for determining possible fraud or based on other factors. These algorithms may include determining whether the payment account is over the limit, closed, delinquent, etc.

In step 1070 other systems provided as part of payment processing network 145 and/or FSP system 130 may transmit the authorization decision to merchant system 120, similar to that described in step 460 above. Upon receipt of an approved authorization decision, a merchant may complete the transaction with user 110.

The above described processes may be implemented as a computer program or application or as a plugin module or sub component of another application. Some of the described processes may be executed by a computing system 200 of FSP system 130, merchant system 120, user device 112 or other system provided as part of payment processing network 145. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity performing the transaction authorization methods, it is to be understood that consistent with disclosed embodiments another entity provided as part of payment processing network 145, for example, may provide such services in conjunction with or separate from a financial service provider. In some embodiments, a financial service provider may provide the disclosed account information, location information and transaction rules as part of a database accessible to payment processing network 145.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A mobile device for temporarily enabling a disabled payment account for use in a transaction, the mobile device comprising:
   a display;
   a communication interface;
   one or more memory devices storing instructions; and
   one or more processors configured to execute instructions to:
      display, via the display, a first indication that a payment account is disabled based on a detection of fraud or potential fraud on the account;
      generate an interface on the display configured for receiving a request to temporarily enable one or more disabled functions of the payment account for use in a one-time transaction, wherein the interface has a region having a selection mechanism;
      receive, in response to the selection mechanism being dragged across the region, a request to temporarily enable the payment account for the transaction, the request comprising a merchant name and an anticipated transaction amount for the transaction;
      analyze a pattern of transactions associated with the payment account to determine a duration of time in which a transaction authorization request may be authorized for the transaction in the payment account;
      generate a transaction rule, the transaction rule defining the duration of time, the merchant name, and the anticipated transaction amount in which a transaction authorization request may be authorized for the payment account;
      forward the request and the generated transaction rule, via the communication interface, to a server;
      generate a first timer configured to display a dynamic countdown indicating an amount of time remaining in the duration of time, wherein the first timer is synchronized with a second timer on the server; and
      upon receiving a response indicating the payment account has been enabled according to the transaction rule for use in the transaction:
         update the first indication to indicate that the payment account is enabled;
         display, via the display, a second indication of information associated with the transaction rule and the updated first indication, the second indication that the payment account is temporarily enabled;
         determine, based on the transaction rule, whether the payment account should be no longer enabled; and
         in response to determining that the payment account should be no longer enabled:
            update the first indication to indicate that the payment account is disabled; and
            display, via the display, the updated first indication that indicates that the payment account is disabled.

2. The mobile device application of claim 1, wherein the duration of time is a predetermined number of minutes.

3. The mobile device application of claim 1, wherein the one or more processors are further configured to:
   determine, based on the transaction rule, a transaction authorization request in the payment account received after the duration of time expires should be declined.

4. The mobile device application of claim 1, wherein the one or more processors are further configured to:
   generate an interface, via the display, comprising a circle having a first color and a second color, the colors depicting an amount of time remaining of the duration of time.

5. The mobile device application of claim 1, wherein the dynamic countdown changes colors based on the amount of time remaining in the duration of time.

6. A method for temporarily enabling a disabled payment account for use in a transaction, the method comprising:
   displaying, via a display, a first indication that a payment account is disabled based on the detection of fraud or potential fraud on the account;
   generating an interface on the display configured for receiving a request to temporarily enable one or more disabled functions of the payment account for use in a one-time transaction, wherein the interface has a region having a selection mechanism;
   receiving, in response to the selection mechanism being dragged across the region, a request to temporarily enable the payment account for use in a transaction, the request comprising a merchant name and an anticipated transaction amount for the transaction;
   analyzing a pattern of transactions associated with the payment account to determine a duration of time in which a transaction authorization request may be authorized for the transaction in the payment account;
   generating a transaction rule, the transaction rule defining the duration of time in which a transaction authorization request may be authorized in the payment account;
   acquiring information associated with the transaction rule, the information comprising the merchant name and an anticipated transaction amount for the transaction;
   transmitting the request and the generated transaction rule, via a communication network, to a server;
   generating a first timer configured to display a dynamic countdown indicating an amount of time remaining in the duration of time, wherein the first timer is synchronized with a second timer on the server;
   receiving a response indicating the payment account has been enabled according to the transaction rule for use in the transaction;
   updating the first indication to indicate that the payment account is enabled;
   receiving, via a communication device, instructions to generate a second indication of information associated with the transaction rule and the updated first indication on a display of a mobile device, the second indication indicating that the payment account is temporarily enabled; and
   displaying an indication that the payment account is temporarily enabled for use in the transaction.

7. The method of claim 6, further comprising displaying, via the display, a timer comprising a circle having a first color and a second color, the colors depicting an amount of time remaining in the duration of time.

8. A non-transitory computer-readable medium storing instructions executable by a processor to cause the processor to perform operations for temporarily enabling a disabled payment account for use in a transaction, the operations comprising:
   displaying, via a display, a first indication that a payment account is disabled based on a detection of fraud or potential fraud on the account;
   generating an interface on the display configured for receiving a request to temporarily enable one or more disabled functions of the payment account for use in a one-time transaction, wherein the interface has a region having a selection mechanism;

receiving in response to the selection mechanism being dragged across the region, a request to temporarily enable the payment account for use in a transaction, the request comprising a merchant name and an anticipated transaction amount for the transaction;

analyzing a pattern of transactions associated with the payment account to determine a duration of time in which a transaction authorization request may be authorized for the transaction in the payment account;

generating a transaction rule, the transaction rule defining the duration of time in which a transaction authorization request may be authorized for the payment account;

acquiring information associated with the transaction rule, the information comprising the merchant name and an anticipated transaction amount for the transaction;

transmitting the request and the generated transaction rule, via a communication network, to a server;

generating a first timer configured to display a dynamic countdown indicating an amount of time remaining in the duration of time, wherein the first timer is synchronized with a second timer on the server;

receiving a response indicating the payment account has been enabled according to the transaction rule for use in the transaction;

updating the first indication to indicate that the payment account is enabled;

receiving, via a communication device, instructions to generate a second indication of information associated with the transaction rule and the updated first indication on a display of a mobile device, the second indication indicating that the payment account is temporarily enabled; and displaying an indication the payment account is temporarily enabled for use in the transaction.

9. The mobile device application of claim 1, wherein the request to temporarily enable the payment account for use in the transaction further comprises an IP address of the mobile device, and wherein the generated transaction rule further identifies the IP address of the mobile device.

10. The mobile device application of claim 1, wherein the request to temporarily enable the payment account for use in the transaction further comprises an identifier associated with a mobile device executing the mobile device application, and the generated transaction rule further defines a payment method limited to a payment initiated by the mobile device associated with the mobile device identifier.

11. The mobile device application of claim 1, wherein the instructions further comprise:

generating, upon receiving the input initiating a request to temporarily enable the payment account for a transaction, an interface configured to receive credentials of a user associated with the payment account and the mobile device executing the mobile application.

12. The mobile device application of claim 11, wherein the credentials of the user further comprises a biometric credential.

13. The mobile device application of claim 1, wherein the generated transaction rule further comprises:

a determined location of a mobile device executing the mobile application, and wherein the response indicating the payment account has been enabled further comprises an indication that the payment account is enabled within a defined distance of a location of the mobile device.

14. The mobile device application of claim 1, wherein the instructions further comprise:

disabling the payment method after an expiration of the duration of time.

15. The mobile device application of claim 1, wherein the instructions further comprise:

disabling the payment method after one transaction, wherein the one transaction comprises a transaction approved based on a transaction authorization request associated with the transaction for which the payment account was temporarily enabled.

16. The mobile device application of claim 1, wherein the request and the transaction rule are transmitted to a financial service provider, and the response indicates the payment account has been temporality enabled according to the transaction rule received from the financial service provider outside of a payment processing network.

\* \* \* \* \*